(12) United States Patent
Ruelas Ibarra et al.

(10) Patent No.: US 12,530,983 B2
(45) Date of Patent: Jan. 20, 2026

(54) DYNAMIC MODIFICATION OF AN EXTENDED REALITY ENVIRONMENT

(71) Applicant: International Business Machines Corporation, Armonk, NY (US)

(72) Inventors: Karelly Ruelas Ibarra, San Pedro Tlaquepaque (MX); Carolina Garcia Delgado, Zapopan (MX); Sarbajit K. Rakshit, Kolkata (IN); Michael Boone, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 18/624,577

(22) Filed: Apr. 2, 2024

(65) Prior Publication Data
US 2025/0308399 A1 Oct. 2, 2025

(51) Int. Cl.
*G09B 5/02* (2006.01)
*G06F 3/16* (2006.01)
*G06T 19/00* (2011.01)
*G06F 3/01* (2006.01)

(52) U.S. Cl.
CPC .............. *G09B 5/02* (2013.01); *G06T 19/006* (2013.01); *G06F 3/017* (2013.01); *G06F 3/16* (2013.01)

(58) Field of Classification Search
CPC ......... G09B 5/02; G06T 19/006; G06F 3/017; G06F 3/16
See application file for complete search history.

(56) References Cited

U.S. PATENT DOCUMENTS

| | | |
|---|---|---|
| 2010/0083140 A1 | 4/2010 | Dawson |
| 2015/0296170 A1 | 10/2015 | Farrell |
| 2019/0342507 A1* | 11/2019 | Dye ................. G06T 13/40 |
| 2020/0314483 A1 | 10/2020 | Rakshit |
| 2020/0404217 A1* | 12/2020 | Yerli ................ G06T 19/006 |
| 2021/0082300 A1 | 3/2021 | Silverstein |
| 2021/0084194 A1 | 3/2021 | Rakshit |
| 2021/0090335 A1 | 3/2021 | Rakshit |

(Continued)

FOREIGN PATENT DOCUMENTS

CN          114092290 A     2/2022

OTHER PUBLICATIONS

Anonymous, "Virtual Engagement," IP.com No. IPCOM000202100D, IP.com Electronic Publication, Dec. 3, 2010.

(Continued)

*Primary Examiner* — Eddy Saint-Vil
(74) *Attorney, Agent, or Firm* — CHIP LAW GROUP

(57) ABSTRACT

Dynamic modification of an extended reality environment include receiving an input associated with a set of rules for rendering a first primary extended reality (XR) environment on a first user device. The first primary XR environment is rendered on the first user device associated with a first avatar and includes the first avatar and a second avatar. A first action of the second avatar of the first set of avatars is detected. Based on the detected first action, the execution of at least a first rule of the set of rules is triggered. The first primary XR environment is modified by masking or unmasking a portion of the second avatar within the first primary XR environment based on the execution of at least the first rule and the modified first primary XR environment is rendered on the first user device.

18 Claims, 13 Drawing Sheets

(56) References Cited

U.S. PATENT DOCUMENTS

| | | | |
|---|---|---|---|
| 2021/0241650 | A1 | 8/2021 | Schlesinger |
| 2021/0248789 | A1* | 8/2021 | Du .................... G06F 16/9538 |
| 2021/0339143 | A1* | 11/2021 | Bar-Zeev ................ G06F 3/017 |
| 2022/0070241 | A1* | 3/2022 | Yerli ...................... G06T 19/00 |
| 2023/0135312 | A1 | 5/2023 | Decrop |
| 2024/0077937 | A1* | 3/2024 | Rickwald ................ G06F 3/013 |
| 2024/0281052 | A1* | 8/2024 | Le Chevalier .......... G06F 3/011 |
| 2024/0379017 | A1* | 11/2024 | Henchy ................. G09B 5/065 |
| 2025/0061193 | A1* | 2/2025 | Singh ................ G06F 21/6218 |
| 2025/0124662 | A1* | 4/2025 | Rodriguez Bravo ....................... G06F 3/0484 |

OTHER PUBLICATIONS

An innovative approach to digital collaboration, IBM, Dec. 7, 2021, 5 pages, doi: https://www.ibm.com/thought-leadership/institute-business-value/report/digital-collaboration-speed-relevance.

Metaverse Market, By Component (Hardware, Software/Platform, and Services), By Device (Desktop, Mobile, Console and Others), By Technology (Blockchain, Virtual Reality (VR) & Augmented Reality (AR) and Mixed Reality (MR)), By Application (Online Shopping, Gaming, Social Media, Content Creation Conference and Others), Globenewswire, Apr. 25, 2022, 7 pages, doi: https://www.globenewswire.com/news-release/2022/04/25/2428281/0/en/Metaverse-Market-is-estimated-to-be-US-947-118-billion-by-2030-with-a-CAGR-of-38-8-during-the-forecast-period-By-PMI.html.

* cited by examiner

DYNAMIC MODIFICATION OF AN EXTENDED REALITY ENVIRONMENT

BACKGROUND

The disclosure relates to computer vision and, more particularly, to dynamic modification of an extended reality environment.

With advancements in computer vision technology, users are now experiencing immersive and interactive digital environments, such as those found in extended reality (XR) environments. An XR environment combines elements of the physical and virtual worlds, offering users interactive and immersive experiences. The increasing adoption of immersive and interactive experiences has led to various events, such as classroom learning, voting, gaming, and more, transitioning from physical real-world settings to virtual environments.

However, existing digital environments typically maintain a static nature, where the content and layout of virtual objects remain fixed throughout the user's experience. This static characteristic often imposes limitations on the level of engagement and realism achievable in virtual experiences.

SUMMARY

According to an embodiment of the disclosure, a computer-implemented method for dynamic modification of an extended reality environment is described. The computer-implemented method includes receiving, by a computer, an input associated with a set of rules for rendering a first primary extended reality (XR) environment on a first user device of a first set of user devices. The computer-implemented method further includes rendering, by the computer, the first primary XR environment on the first user device associated with a first avatar of a first set of avatars. The first primary XR environment includes the first avatar and a second avatar of the first set of avatars. The computer-implemented method further includes detecting, by the computer, a first action of the second avatar of the first set of avatars. The computer-implemented method further includes triggering, by the computer, execution of at least a first rule of the set of rules based on the detected first action. The computer-implemented method further includes modifying, by the computer, the first primary XR environment by masking or unmasking a portion of the second avatar within the first primary XR environment based on the execution of at least the first rule. The computer-implemented method further includes rendering, by the computer, the modified first primary XR environment on the first user device.

According to one or more embodiments of the disclosure, a system for dynamic modification of the extended reality environment is described. The system performs a method for dynamic modification of an extended reality environment. The method includes receiving an input associated with a set of rules for rendering a first primary extended reality (XR) environment on a first user device of a first set of user devices. The method further includes rendering the first primary XR environment on the first user device associated with a first avatar of a first set of avatars. The first primary XR environment includes the first avatar and a second avatar of the first set of avatars. The method further includes detecting a first action of the second avatar of the first set of avatars. The method further includes triggering the execution of at least a first rule of the set of rules based on the detected first action. The method further includes modifying the first primary XR environment by masking or unmasking a portion of the second avatar within the first primary XR environment based on the execution of at least the first rule. The method further includes rendering the modified first primary XR environment on the first user device.

According to one or more embodiments of the disclosure, a computer program product for dynamic modification of an extended reality environment is described. The computer program product includes a computer-readable storage medium having program instructions embodied therewith, the program instructions executable by a system to cause the system to receive an input associated with a set of rules for rendering a first primary extended reality (XR) environment on a first user device of a first set of user devices. The program instructions further include rendering the first primary XR environment on the first user device associated with a first avatar of a first set of avatars. The first primary XR environment includes the first avatar and a second avatar of the first set of avatars. The program instructions further include detecting a first action of the second avatar of the first set of avatars. The program instructions further include triggering execution of at least a first rule of the set of rules based on the detected first action. The program instructions further include modifying the first primary XR environment by masking or unmasking a portion of the second avatar within the first primary XR environment based on the execution of at least the first rule. The program instructions further include rendering the modified first primary XR environment on the first user device.

Additional technical features and benefits are realized through the techniques of the disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures wherein.

DETAILED DESCRIPTION

Figure 1:
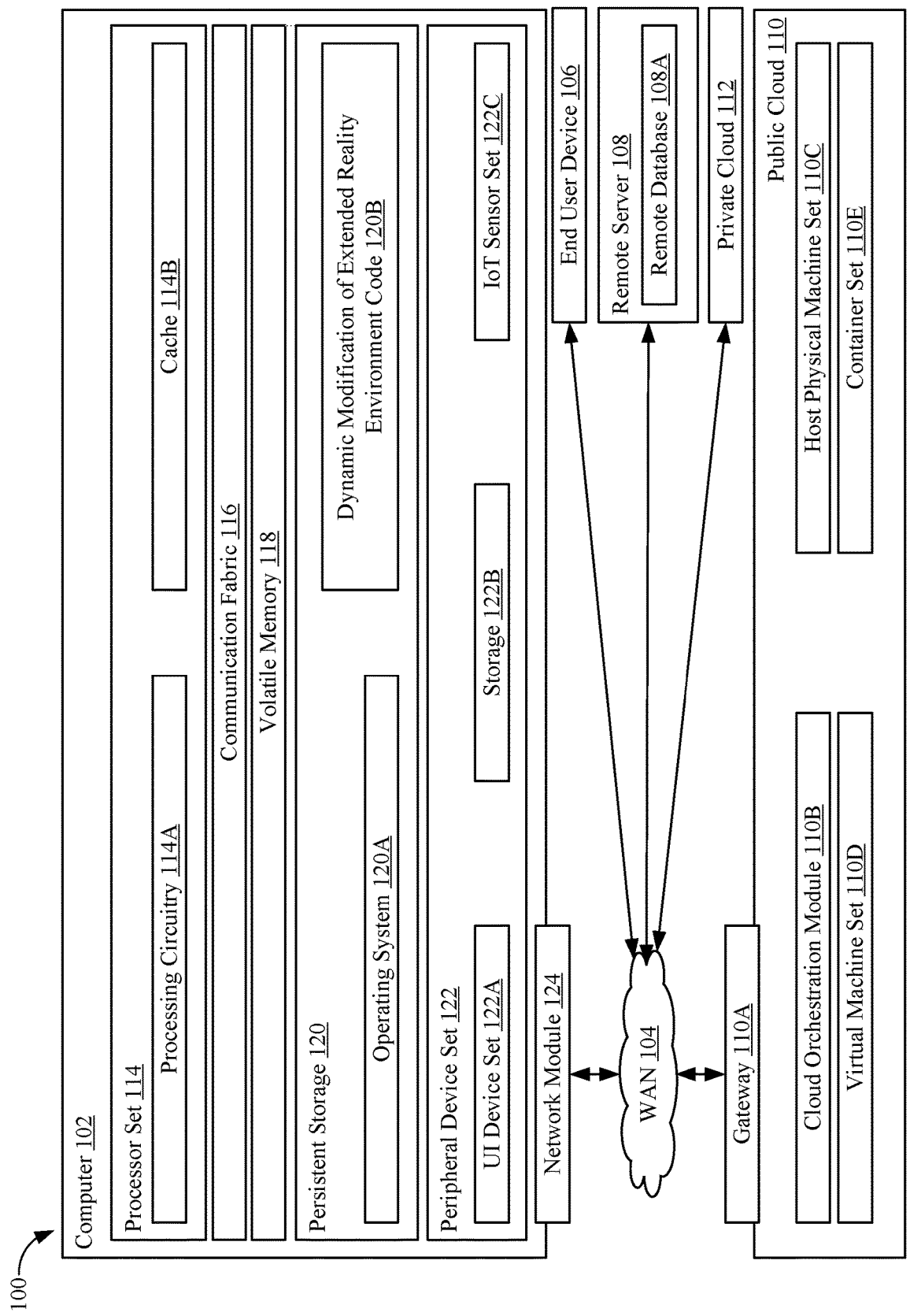
FIG. 1 is a diagram that illustrates a computing environment for dynamic modification of an extended reality environment, in accordance with an embodiment of the disclosure.

Virtual reality (VR) refers to a computer-generated simulation of an environment that allows users to interact with a three-dimensional, immersive artificial environment within an event. VR creates a sense of presence, enabling users to feel as though they are truly present in the virtual environment. For example, education in virtual reality (VR) refers to the use of immersive technology to create educational experiences that take place in a virtual or simulated environment. In this approach to education, learners can interact with virtual objects, environments, and scenarios that replicate real-world situations and challenges. Using VR technology, educators can create engaging, interactive, and personalized learning experiences that go beyond traditional classroom settings. For example, learners can explore historical landmarks, perform virtual dissections, practice language skills with native speakers, or even take part in collaborative problem-solving exercises with peers from around the world.

Generally, virtual reality education can be used at all levels of education, from elementary school to graduate studies. The technology can also be applied to a wide range of subjects, from science and math to the humanities and the arts. Overall, education in VR has the potential to enhance learning outcomes, increase student engagement and motivation, and provide learners with access to new opportunities and experiences that may not be possible in traditional classroom settings. Moreover, there are many advantages of learning with virtual reality (VR) such as, but not limited to, Enhanced Engagement, Increased Retention, Safe Environment, Personalized Learning, Access to Remote Learning, and cost-effective.

However, there are some challenges with VR education. For example, in the VR education environment, the avatars of all the participants avatars are visible to every participant. In scenarios like VR educational sessions, the teacher can ask quiz questions to students, and the students can respond. However, if any student responds, all other students immediately get the answer, which prevents the teacher from getting the response to the same question from other students. Therefore, there is a need for a system where only the teacher can visualize the responses from students, allowing them to receive replies from each student in the classroom.

According to an embodiment of the disclosure, a computer-implemented method for dynamic modification of an extended reality environment is described. The computer-implemented method includes receiving, by a computer, an input associated with a set of rules for rendering a first primary extended reality (XR) environment on a first user device of a first set of user devices. The computer-implemented method further includes rendering, by the computer, the first primary XR environment on the first user device associated with a first avatar of a first set of avatars. The first primary XR environment includes the first avatar and a second avatar of the first set of avatars. The computer-implemented method further includes detecting, by the computer, a first action of the second avatar of the first set of avatars. The computer-implemented method further includes triggering, by the computer, execution of at least a first rule of the set of rules based on the detected first action. The computer-implemented method further includes modifying, by the computer, the first primary XR environment by masking or unmasking a portion of the second avatar within the first primary XR environment based on the execution of at least the first rule. The computer-implemented method further includes rendering, by the computer, the modified first primary XR environment on the first user device.

In other embodiments of the disclosure, the computer-implemented method further includes rendering, by the computer, a second primary XR environment including the second avatar on a second user device of the first set of user devices. The second user device is associated with the second avatar. The computer-implemented method further includes detecting, by the computer, a second action of the first avatar of the first set of avatars. The computer-implemented method further includes triggering, by the computer, execution of at least a second rule of the set of rules based on the detected second action. The computer-implemented method further includes modifying, by the computer, the second primary XR environment by masking or unmasking a portion of the first avatar within the second primary XR environment based on the execution of at least the second rule. The computer-implemented method further includes rendering, by the computer, the modified second primary XR environment on the second user device.

In other embodiments of the disclosure, the first primary XR environment is associated with an event. The first primary XR environment is moderated by a set of moderators in a real-world environment and attended by a set of participants in the real-world environment.

In other embodiments of the disclosure, the first action is detected based on one or more gestures of a first participant of the set of participants, or an utterance of a speech by the first participant. The first avatar of the first set of avatars is associated with the first participant of the set of participants.

In other embodiments of the disclosure, the computer-implemented method further includes rendering, by the computer, a first secondary XR environment comprising the first avatar and the second avatar on a first user device of a second set of user devices. The second set of user devices is associated with the set of moderators. The computer-implemented method further includes detecting, by the computer, the first action of the second avatar. The computer-implemented method further includes modifying, by the computer, the first secondary XR environment based on the detected first action. The computer-implemented method further includes rendering, by the computer, the modified first secondary XR environment on the first user device of the second set of user devices. The modified first secondary XR environment indicates the first action of the second avatar.

In other embodiments of the disclosure, the computer-implemented method further includes modifying, by the computer, the first secondary XR environment to include one or more markers associated with the second avatar based on the detected first action. The computer-implemented method further includes rendering, by the computer, the modified first secondary XR environment on at least one of the second set of user devices.

In other embodiments of the disclosure, the input is received from a second set of user devices associated with a set of moderators of the first primary XR environment.

In other embodiments of the disclosure, the first primary XR environment further includes a second set of avatars associated with the set of moderators of an event associated with the first primary XR environment.

In other embodiments of the disclosure, the computer-implemented method further includes generating, by the computer, the first primary XR environment based on the set of rules. The first primary XR environment is customized for a first participant of a set of participants of the first primary XR environment. The computer-implemented method further includes rendering, by the computer, the first primary XR environment on the first user device of the first set of user devices. The first user device is associated with the first participant.

In other embodiments of the disclosure, the portion of the second avatar is masked within the first primary XR environment. The modification of the first primary XR environment corresponds to the unmasking of the portion of the second avatar within the first primary XR environment.

In other embodiments of the disclosure, the portion of the second avatar is unmasked within the first primary XR environment. The modification of the first primary XR environment corresponds to the masking of the portion of the second avatar within the first primary XR environment.

In other embodiments of the disclosure, the computer-implemented method further includes receiving, by the computer, a setup input associated with a generation of the first XR environment associated with an event. The computer-implemented method further includes identifying, by the computer, a set of participants and a set of moderators based on the setup input. The computer-implemented method further includes generating, by the computer, the first set of avatars associated with the set of participants and the second set of avatars associated with the set of moderators based on the identification. The computer-implemented method further includes rendering, by the computer, the first primary XR environment on the first user device, the first primary XR environment comprises the first avatar of the first set of avatars and at least one avatar of the second set of avatars.

In other embodiments of the disclosure, the computer-implemented method further includes comparing, by the computer, the detected first action with a pre-set action. The computer-implemented method further includes triggering, by the computer, the execution of at least the first rule of the set of rules based on the comparison.

In other embodiments of the disclosure, the set of rules is associated with at least one of the modifications of the first primary XR environment or the rendering of the modified first primary XR environment on the first user device.

In other embodiments of the disclosure, the first primary XR environment is associated with an event. The event corresponds to a learning workshop.

In other embodiments of the disclosure, the first set of avatars within the first primary XR environment is associated with a set of students attending the learning workshop. A second set of avatars within the first primary XR environment is associated with a set of teachers conducting the learning workshop.

According to one or more embodiments of the disclosure, a system for dynamic modification of the extended reality environment is described. The system performs a method for dynamic modification of an extended reality environment. The method includes receiving an input associated with a set of rules for rendering a first primary extended reality (XR) environment on a first user device of a first set of user devices. The method further includes rendering the first primary XR environment on the first user device associated with a first avatar of a first set of avatars. The first primary XR environment includes the first avatar and a second avatar of the first set of avatars. The method further includes detecting a first action of the second avatar of the first set of avatars. The method further includes triggering the execution of at least a first rule of the set of rules based on the detected first action. The method further includes modifying the first primary XR environment by masking or unmasking a portion of the second avatar within the first primary XR environment based on the execution of at least the first rule. The method further includes rendering the modified first primary XR environment on the first user device.

According to one or more embodiments of the disclosure, a computer program product for dynamic modification of an extended reality environment is described. The computer program product includes a computer-readable storage medium having program instructions embodied therewith, the program instructions executable by a system to cause the system to receive an input associated with a set of rules for rendering a first primary extended reality (XR) environment on a first user device of a first set of user devices. The program instructions further include rendering the first primary XR environment on the first user device associated with a first avatar of a first set of avatars. The first primary XR environment includes the first avatar and a second avatar of the first set of avatars. The program instructions further include detecting a first action of the second avatar of the first set of avatars. The program instructions further include triggering execution of at least a first rule of the set of rules based on the detected first action. The program instructions further include modifying the first primary XR environment by masking or unmasking a portion of the second avatar within the first primary XR environment based on the execution of at least the first rule. The program instructions further include rendering the modified first primary XR environment on the first user device.

Various aspects of the disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for dynamic modification of an extended reality environment, in accordance with an embodiment of the disclosure. With reference to FIG. 1, there is shown a computing environment 100 that contains an example of an environment for the execution of at least some of the computer code involved in performing the inventive methods, such as a dynamic modification of extended reality environment code 120B. In addition to the dynamic modification of extended reality environment code 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the dynamic modification of extended reality environment code 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network or querying a database, such as a remote database 130. As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as the cache 114B and the other storage media discussed below. The program instructions, and associated data, are accessed by the processor set 114 to control and direct the performance of the inventive methods. In computing environment 100, at least some of the instructions for performing the inventive methods may be stored in the dynamic modification of extended reality environment code 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the dynamic modification of extended reality environment code 120B typically includes at least some of the computer code involved in performing the inventive methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor may be a thermometer and another sensor may be a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In other embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the inventive methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present recommendations to an end user. In some embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 130 of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in other embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
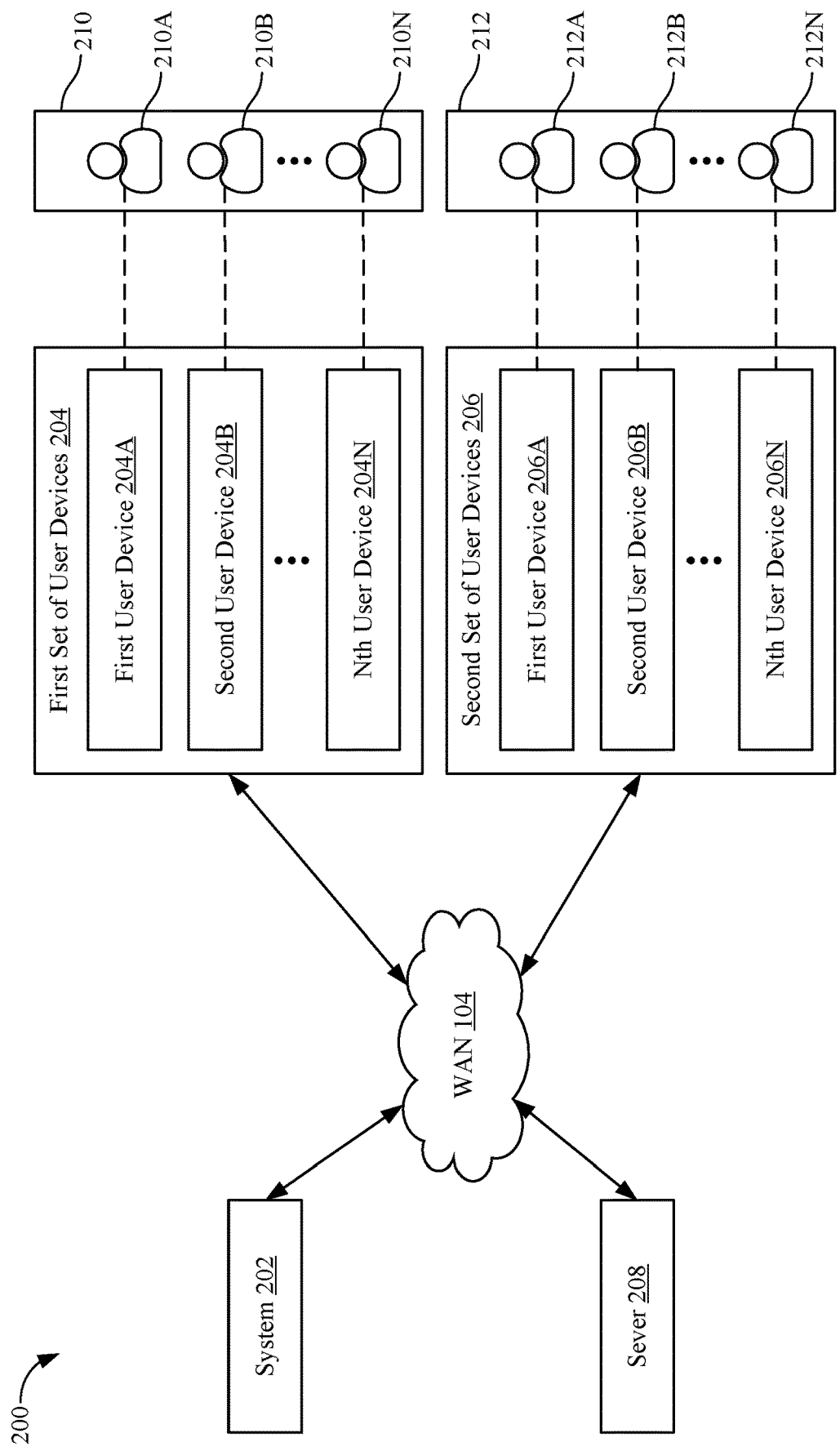
FIG. 2 is a diagram that illustrates an environment for dynamic modification of the extended reality environment, in accordance with an embodiment of the disclosure.

FIG. 2 is a diagram that illustrates an environment for dynamic modification of the extended reality environment, in accordance with an embodiment of the disclosure. FIG. 2 is explained in conjunction with elements from FIG. 1. With reference to FIG. 2, there is shown a diagram of a network environment 200. The network environment 200 includes a system 202, a first set of user devices 204, a second set of user devices 206, and a server 208. The network environment 200 further includes a set of participants 210 and a set of moderators 212. The first set of user devices 204 may be associated with the set of participants 210 and the second set of user devices 206 may be associated with the set of moderators 212. The network environment 200 further includes the WAN 104 of FIG. 1. In an embodiment of the disclosure, each of the first set of user devices 204 and the second set of user devices 206 may be an exemplary embodiment of the EUD 106. Similarly, the system 202 may be an exemplary embodiment of the computer 102 in FIG. 1.

The system 202 may include suitable logic, circuitry, interfaces, and/or code that may be configured for dynamic modification of an extended reality (XR) environment. The system 202 may be configured to receive an input associated with a set of rules for rendering a first primary extended reality (XR) environment on a first user device 204A of the first set of user devices 204. The system 202 may be configured to render the first primary XR environment on the first user device 204A associated with a first avatar of a first set of avatars. The first primary XR environment may include the first avatar and a second avatar of the first set of avatars.

The system 202 may be further configured to detect a first action of the second avatar of the first set of avatars. The system 202 may be further configured to trigger execution of at least a first rule of the set of rules based on the detected first action. The system 202 may be further configured to modify the first primary XR environment by masking or unmasking a portion of the second avatar within the first primary XR environment based on the execution of at least the first rule. The system 202 may be further configured to render the modified first primary XR environment on the first user device 204A. Examples of the system 202 may include, but are not limited to, a server, a computing device, a virtual computing device, a mainframe machine, a computer workstation, a smartphone, a cellular phone, a mobile phone, a gaming device, or a consumer electronic (CE) device.

Each user device of the first set of user devices 204 may include suitable logic, circuitry, interfaces, and/or code that may be configured to render a corresponding primary XR environment and a modified primary XR environment. For example, the first primary XR environment may be rendered on the first user device 204A of the first set of user devices 204, and a second primary XR environment may be rendered on the second user device 204B of the first set of user devices 204, and an Nth primary XR environment may be rendered on the Nth user device 204N of the first set of user devices 204. Each user device of the first set of user devices 204 may include a display screen. Examples of each user device of the first set of user devices 204 may include, but are not limited to, a head-mounted device, a Virtual Reality (VR) Headset, an Augmented Reality (AR) Device, a Mixed Reality (MR) Device, a Projection-based System, a computing device, a mainframe machine, a server, a computer work-station, a smartphone, a cellular phone, a mobile phone, a gaming device, a consumer electronic (CE) device and/or any other device with computer vision display capabilities.

The display screen may comprise suitable logic, circuitry, and interfaces that may be configured to render the corresponding primary XR environment and the modified primary XR environment. In some embodiments of the disclosure, the display screen may be an external display device associated with the corresponding user device of the first set of user devices 204. The display screen may be a touch screen which may enable the user to provide the user input via the display screen. The touch screen may be at least one of a resistive touch screen, a capacitive touch screen, or a thermal touch screen. In accordance with an embodiment of the disclosure, the display screen may refer to a display screen of a head-mounted device (HMD), a smart-glass device, a see-through display, a projection-based display, an electro-chromic display, or a transparent display. In some embodiments of the disclosure, the display screen may be realized through several known technologies such as, but are not limited to, at least one of a Liquid Crystal Display (LCD) display, a Light Emitting Diode (LED) display, a plasma display, or an Organic LED (OLED) display technology, or other display devices.

Each user device of the second set of user devices 206 may include suitable logic, circuitry, interfaces, and/or code that may be configured to render a corresponding secondary XR environment and a modified secondary XR environment. For example, the first secondary XR environment may be rendered on the first user device 206A of the second set of user devices 206, a second primary XR environment may be rendered on the second user device 206B of the second set of user devices 206, and an Nth secondary XR environment may be rendered on the Nth user device 206N of the second set of user devices 206. Each user device of the second set of user devices 206 may include a display screen. Examples of each user device of the second set of user devices 206 may include, but are not limited to, a head-mounted device, a Virtual Reality (VR) Headset, an Augmented Reality (AR) Device, a Mixed Reality (MR) Device, a Projection-based System, a computing device, a mainframe machine, a server, a computer work-station, a smartphone, a cellular phone, a mobile phone, a gaming device, a consumer electronic (CE) device and/or any other device with computer vision display capabilities.

Similar to the first set of user devices 204, each user device of the second set of user devices 206 may include a display screen that may render the corresponding secondary XR environment and the modified secondary XR environment. Details about the display screen of the second set of user devices 206 have been omitted for the sake of brevity.

The server 208 may include suitable logic, circuitry, and interfaces, and/or code that may be configured to store the set of rules. The server 208 may be configured to generate the primary XR environment and the secondary XR environment. In an embodiment of the disclosure, the server 208 may be further configured to modify the primary XR environment, and the secondary XR environment. The server 208 may be implemented as a cloud server and may execute operations through web applications, cloud applications, HTTP requests, repository operations, file transfer, and the like. Other example implementations of the server 208 may include, but are not limited to, a database server, a file server, a web server, a media server, an application server, a mainframe server, or a cloud computing server.

In an embodiment of the disclosure, the server 208 may be implemented as a plurality of distributed cloud-based resources by use of several technologies that are well known to those ordinarily skilled in the art. A person with ordinary skill in the art will understand that the scope of the disclosure may not be limited to the implementation of the server 208 and the system 202 as two separate entities. In certain embodiments, the functionalities of the server 208 can be incorporated in its entirety or at least partially in the system 202, without a departure from the scope of the disclosure.

In operation, the system 202 may be configured to receive an input associated with a set of rules for rendering the first primary XR environment on the first user device 204A of the first set of user devices 204. Based on the reception of the input, the system 202 may be configured to render the first primary XR environment on the first user device 204A associated with the first avatar of the first set of avatars. In an embodiment of the disclosure, the first set of avatars may be associated with the set of participants 210. The first primary XR environment may include at least the first avatar and a second avatar of the first set of avatars. Details about the set of avatars are provided, for example, in FIG. 3.

The system 202 may be further configured to detect a first action of the second avatar of the first set of avatars. Based on the detected first action, the system 202 may be further configured to trigger execution of at least a first rule of the set of rules. In an embodiment of the disclosure, the first action may be detected based on one or more gestures of a first participant 210A of the set of participants 210, or an utterance of a speech by the first participant 210A. As discussed above, the first avatar of the first set of avatars may be associated with the first participant 210A of the set of participants 210.

In an embodiment of the disclosure, the system 202 may be further configured to modify the first primary XR environment by masking or unmasking a portion of the second avatar within the first primary XR environment based on the execution of at least the first rule. The system 202 may be further configured to render the modified first primary XR environment on the first user device 204A.

In an embodiment of the disclosure, the portion of the second avatar may be masked within the first primary XR environment. In such a scenario, the modification of the first primary XR environment may correspond to the unmasking of the portion of the second avatar within the first primary XR environment.

In an embodiment of the disclosure, the portion of the second avatar may be unmasked within the first primary XR environment. In such a scenario, the modification of the first primary XR environment may correspond to the masking of the portion of the second avatar within the first primary XR environment.

Figure 3:
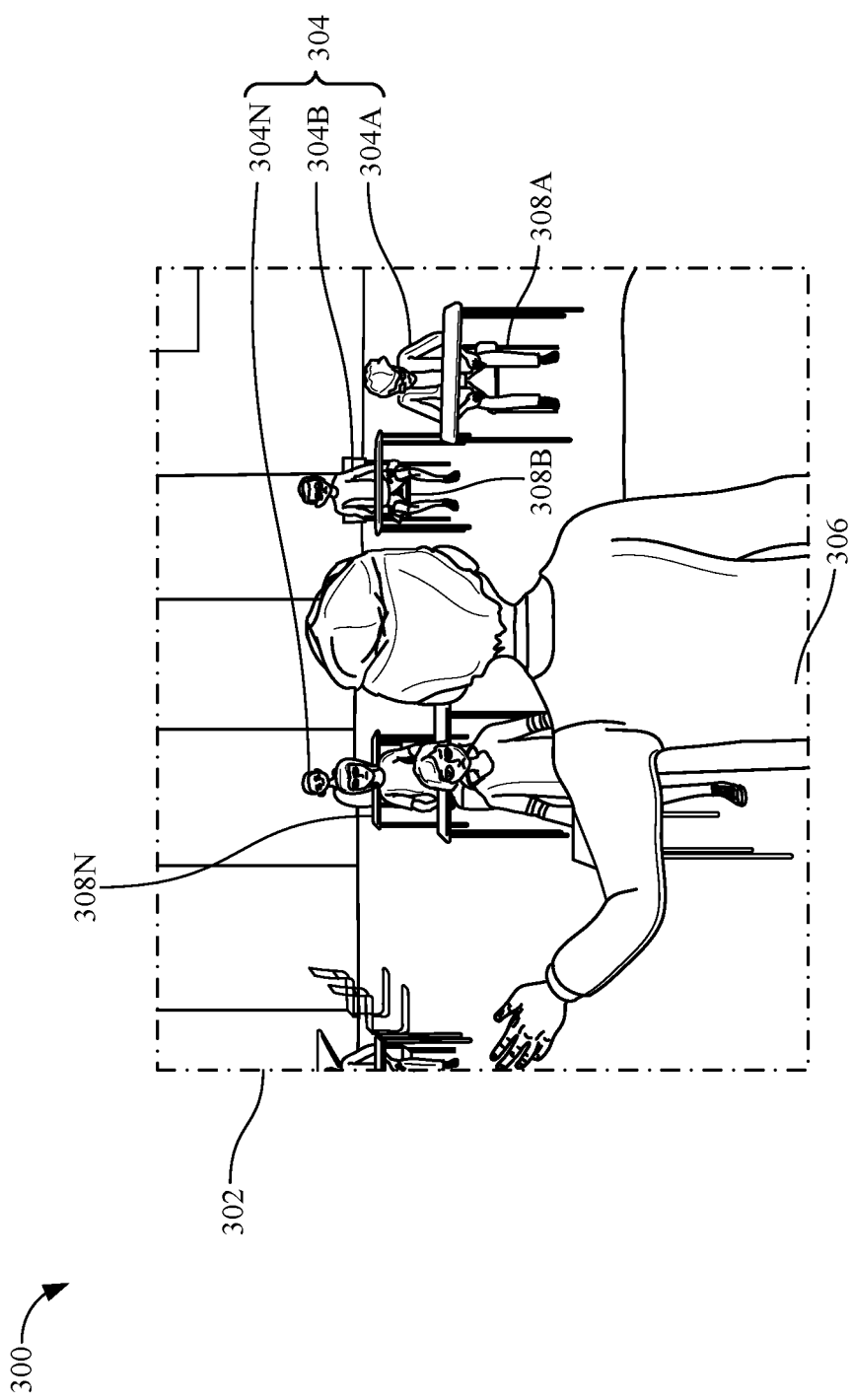
FIG. 3 depicts an exemplary XR environment, in accordance with an embodiment of the disclosure.

FIG. 3 depicts an exemplary XR environment, in accordance with an embodiment of the disclosure. FIG. 3 is explained in conjunction with elements from FIG. 1 and FIG. 2. With reference to FIG. 3, there is shown an exemplary diagram 300 that includes an XR environment 302, a first set of avatars 304, a first avatar 306 of a second set of avatars, and a set of virtual objects 308.

The XR environment 302 (also referred to as a virtual environment) may correspond to a digital space that may incorporate one or more elements of the physical world, computer-generated imagery, and interactive experiences. The XR environment 302 encompasses various immersive technologies such as Virtual Reality (VR), Augmented Reality (AR), Mixed Reality (MR), extended reality (XR), and metaverse.

In an embodiment of the disclosure, the XR environment 302 may be associated with an event in a real-world environment. The event in the real-world environment may refer to a specific occurrence or happening that takes place within the physical realm, involving one or more individuals, groups, or entities. The event may be attended by the set of participants 210 in the real-world environment and moderated by the set of moderators 212 in the real-world environment. By way of example and not limitation, the XR environment 302 may correspond to a learning workshop. The set of participants 210 may correspond to a set of students attending the learning workshop and the set of moderators 212 may correspond to a set of teachers conducting the learning workshop.

In an embodiment of the disclosure, the XR environment 302 may include the first set of avatars 304. Each avatar of the first set of avatars 304 may correspond to a digital representation or an embodiment of a participant of the set of participants 210 in the XR environment 302. For example, a first avatar 304A of the first set of avatars 304 may correspond to the digital representation of the first participant 210A, a second avatar 304B of the first set of avatars 304 may correspond to the digital representation of the second participant 210B. Similarly, an Nth avatar 304N of the first set of avatars 304 may correspond to the digital representation of the first participant 210N.

In an embodiment of the disclosure, the XR environment 302 may include the first avatar 306 of a second set of avatars. Each avatar of the second set of avatars may correspond to a digital representation or an embodiment of a moderator of the set of moderators in the XR environment 302. For example, the first avatar 306 of the second set of avatars may correspond to the digital representation of the first moderator 212A.

In an embodiment of the disclosure, the XR environment 302 may include the set of virtual objects 308 that may correspond to the digital representations of physical objects that users can interact with within the XR environment 302. In an embodiment of the disclosure, the system 202 may be configured to generate the set of virtual objects using computer-generated graphics and may be further integrated into the XR environment 302 to provide the set of participants 210 and the set of moderators 212 with a sense of presence and immersion. The set of virtual objects 308 may include a first virtual object 308A, a second virtual object 308B, up to an Nth virtual object 308N.

By way of example and not limitation, the set of virtual objects 308 may include the first virtual object 308A that may correspond to the digital representations of a chair on which the first avatar 304A may be sitting. The set of virtual objects 308 may include the second virtual object 308B which may correspond to the digital representations of a desk that the second avatar 304B may be using. Similarly, the set of virtual objects 308 may include the Nth virtual object 308N that may correspond to the digital representations of a desk that the Nth avatar 304N may be using.

In the XR environment 302, users (both the set of participants 210 and the set of moderators 212) may interact with and navigate through synthetic surroundings that range from entirely computer-generated landscapes to digitally enhanced versions of real-world settings and may be accessed through specialized hardware such as VR headsets, AR glasses, or mobile devices, which enable the users to perceive and interact with the digital content.

Figure 4:
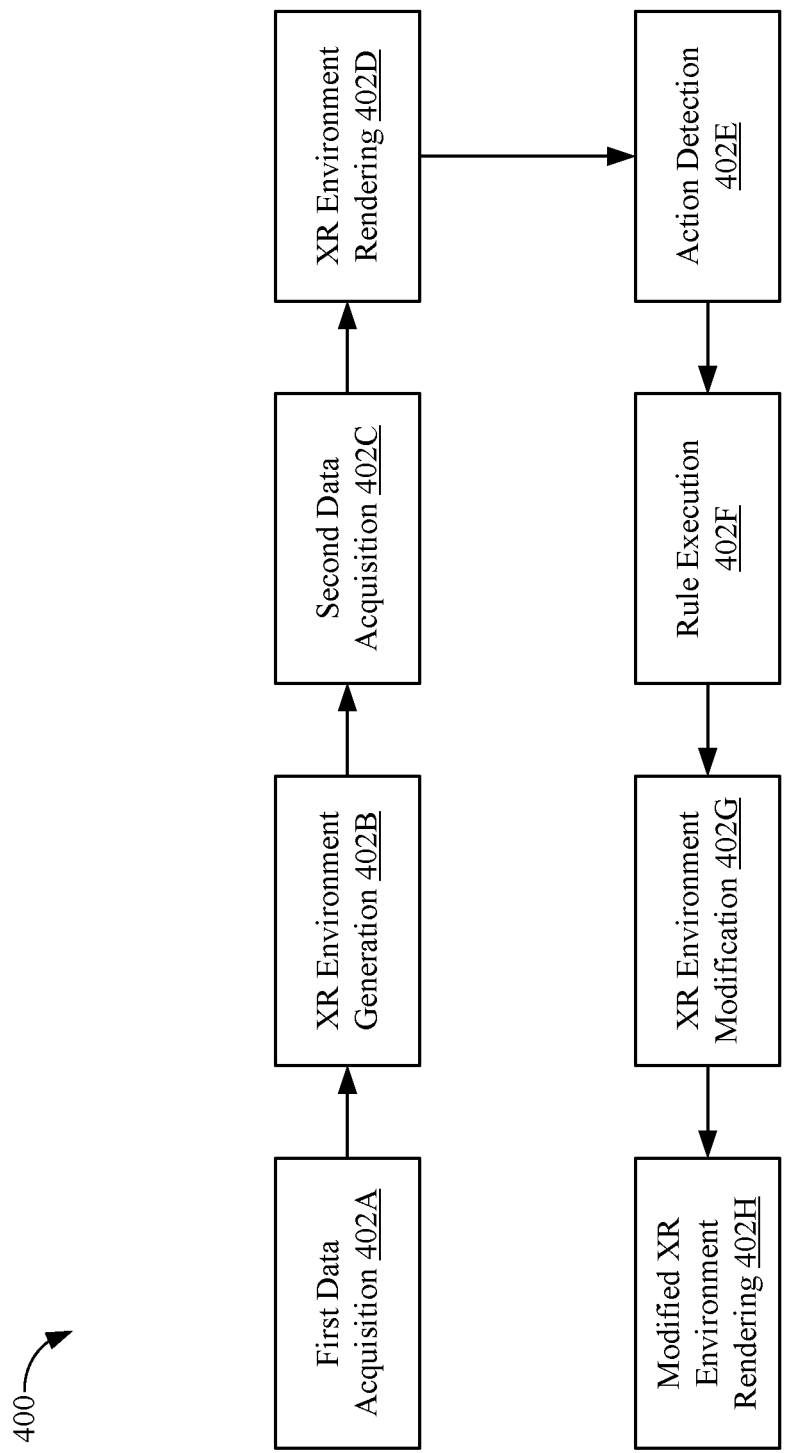
FIG. 4 is a diagram that illustrates exemplary operations for dynamic modification of the extended reality environment, in accordance with an embodiment of the disclosure.

FIG. 4 is a diagram that illustrates exemplary operations for dynamic modification of the extended reality environment, in accordance with an embodiment of the disclosure. FIG. 4 is explained in conjunction with elements from FIG. 1, FIG. 2, and FIG. 3. With reference to FIG. 4, there is shown a block diagram 400 that illustrates exemplary operations from 402A to 402H, as described herein. The exemplary operations illustrated in the block diagram 400 may start at 402A and may be performed by any computing system, apparatus, or device, such as by the computer 102 of FIG. 1 or system 202 of FIG. 2. Although illustrated with discrete blocks, the exemplary operations associated with one or more blocks of the block diagram 400 may be divided into additional blocks, combined into fewer blocks, or eliminated, depending on the particular implementation.

Figure 5:
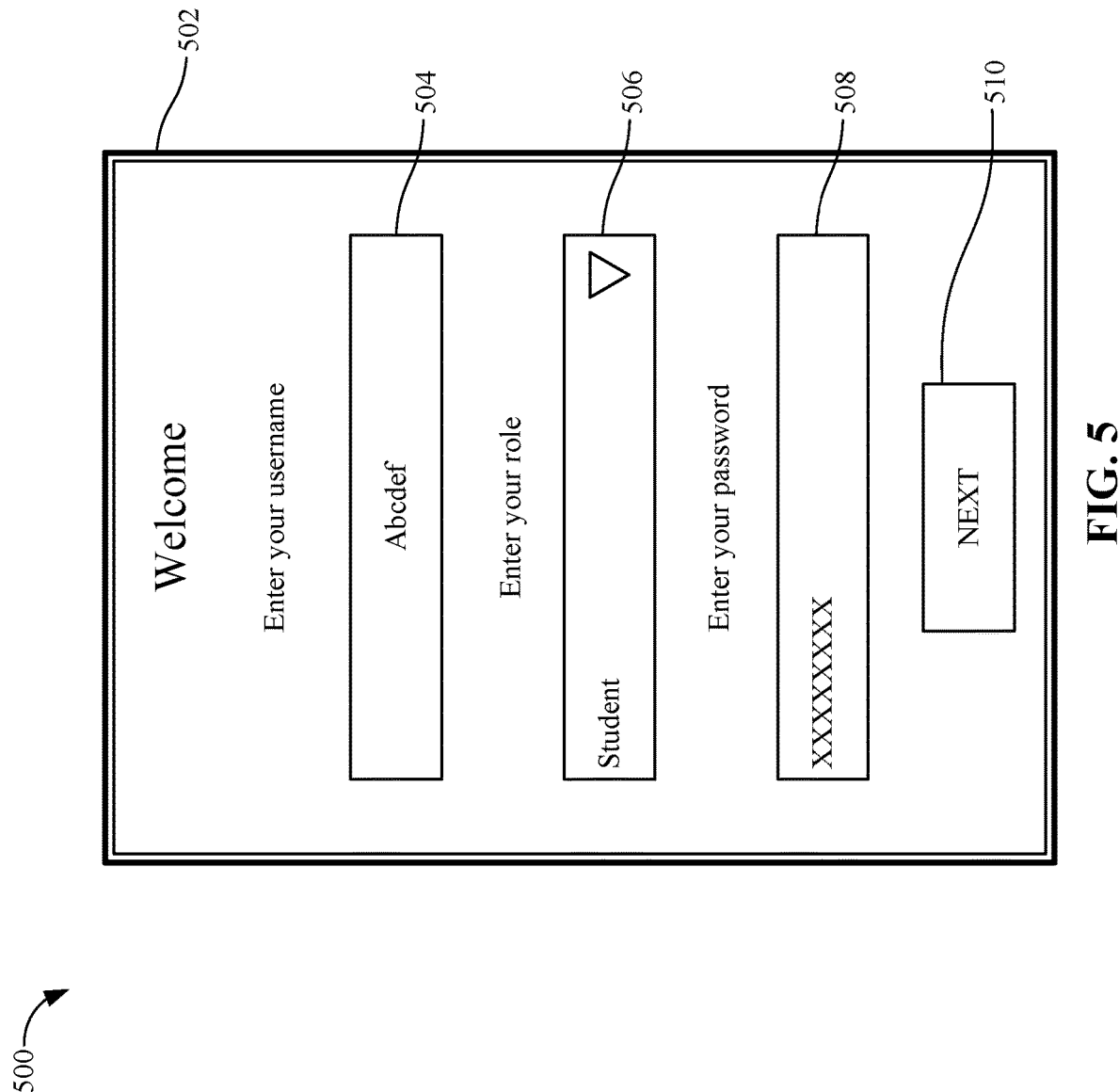
FIG. 5 is a diagram that depicts an exemplary registration page for the event associated with the XR environment, in accordance with an embodiment of the disclosure.

At 402A, a first data acquisition operation may be executed. In the first data acquisition operation, the system 202 may be configured to receive a setup input associated with a generation of the first primary XR environment associated with an event. As discussed above and not as a limitation, the event may correspond to a learning workshop. Based on the reception of the setup input, the system 202 may be configured to identify the set of participants 210 and the set of moderators 212 of the event. In an embodiment of the disclosure, the set of participants 210 and the set of moderators 212 may be identified based on their roles that may be assigned by an administrator during the registration of the set of participants 210 and the set of moderators 212 for the event as shown in FIG. 5.

At 402B, an XR environment generation operation may be executed. In the XR environment generation operation, the system 202 may be configured to generate the XR environment 302 to be viewed by the set of participants and the set of moderators. The XR environment 302 may correspond to a digital space that incorporates elements of the physical world, computer-generated imagery, and interactive experiences. The system 202 may be further configured to generate the first set of avatars 304 associated with the set of participants, and the second set of avatars associated with the set of moderators. Further, the system 202 may be configured to generate the set of virtual objects 308 to be included in the XR environment 302 as shown in FIG. 3.

At 402C, a second data acquisition operation may be executed. In the second data acquisition operation, the system 202 may be configured to receive an input associated with a set of rules for rendering a first primary extended reality (XR) environment on the first user device 204A of the first set of user devices 204. The first primary XR environment may be generated based on the XR environment generated at 402B. In an embodiment of the disclosure, the first primary XR environment may correspond to a portion of the XR environment and may be customized for the first participant 210A of the set of participants 210.

In an embodiment of the disclosure, the input may be received from at least one user device of the second set of user devices 206 associated with the set of moderators 212 of the first primary XR environment. The set of rules may be associated with at least one of the modifications of the first primary XR environment or the rendering of the modified first primary XR environment on the first user device 204A. In an embodiment of the disclosure, the set of rules may correspond to a set of security rules. For example, a first rule of the set of rules may correspond to how the XR environment may be customized for each participant and how the XR environment will be modified after at least a first action has been detected.

At 402D, an XR environment rendering operation may be executed. In the XR environment rendering operation, the system 202 may be configured to render the first primary XR environment on the first user device 204A associated with the first avatar 304A of the first set of avatars 304. The first primary XR environment may include the first avatar 304A and the second avatar 304B of the first set of avatars 304. In an embodiment of the disclosure, the first avatar 304A may be visible within the first primary XR environment rendered on the first user device 204A, and a portion of the second avatar 304B may be masked (or unmasked) within the first primary XR environment rendered on the first user device 204A.

The system 202 may be configured to render a second primary XR environment on the second user device 204B associated with the second avatar of the first set of avatars 304. The second primary XR environment may include the first avatar 304A and the second avatar 304B of the first set of avatars 304. In an embodiment of the disclosure, the second avatar 304B may be visible within the second primary XR environment rendered on the second user device 204B, and a portion of the first avatar 304A may be masked (or unmasked) within the second primary XR environment rendered on the second user device 204B.

The system 202 may be configured to render a first secondary XR environment that may include the first avatar 304A and the second avatar 304B of the first set of avatars 304 on the first user device 206A of a second set of user devices 206. As discussed above, the second set of user devices 206 may be associated with the set of moderators 212 of the event in the real-world environment and XR environment (inclusive of both the primary XR environments and the secondary XR environments). In an embodiment of the disclosure, the first avatar 306 of the second set of avatars may also be included within the first secondary XR environment.

At 402E, an action detection operation may be executed. In the action detection operation, the system 202 may be configured to detect a first action of the second avatar 304B of the first set of avatars 304. In an embodiment of the disclosure, the first action may be performed based on a trigger. For example, in the learning workshop, the teacher (who may be the moderator) may ask a question, and the students (who may be the participants) may answer the question. Such answering to the question may correspond to the first action.

In an embodiment of the disclosure, the first action may be detected based on one or more gestures of the second participant 210B of the set of participants 210 (such as raising a hand to answer the question), or an utterance of a speech by the second participant 210B (such as answering the question). The second avatar 304B of the first set of avatars 304 may be associated with the second participant 210B of the set of participants 210. The first action, in reality, may be performed by the second participant 210B in the real-world environment and may be replicated by the second avatar 304B and therefore, detected in the XR environment. In an embodiment of the disclosure, the system 202 may be configured to detect a second action that may be performed by the first avatar 304A of the first set of avatars 304.

At 402F, a rule execution operation may be executed. In the rule execution operation, the system 202 may be configured to trigger the execution of at least the first rule of the set of rules. The at least first rule of the set of rules may be executed based on the detected first action. In an embodiment of the disclosure, the system 202 may be configured to trigger the execution of at least a second rule of the set of rules based on the detected second action.

By way of example, when a teacher (or a moderator) asks a question to the entire classroom of the set of participants 210, the teacher or the moderator may dynamically assign visualization rights to different students or groups of participants based on the responses provided. Such visualization rights may ensure that, if the first participant 210A or a first group of participants respond, a second group of participants may not be able to hear or see that particular answer, so that the teacher may get a response to the same question from each of the students.

In an embodiment of the disclosure, based on the security rule defined by the teacher or the moderator of the event, the system 202 may be configured to evaluate the context of the XR environment, like the first participant 210A is responding to the question with appropriate body language, then only teacher or moderator may visualize the spoken content and body language of the first participant 210A, and other participants may not be able to listen and the body language while responding to the question.

In an embodiment of the disclosure, the system 202 may operate according to the security rules defined by the teacher or the moderator during the question session. The system 202 may be configured to wait for the teacher to revoke the security rule, or the teacher may define the security rule based on a specific collaboration context. This means that when the identified collaboration context is detected, like a question-and-answer session, then the system 202 may enforce the specified security rule. Furthermore, based on the defined security rule during metaverse collaboration, the system 202 may identify which group of participants may visualize the response from the first participant 210A along with the teacher, and which second group of students may not be able to see or hear the response. For the second group of students, the system 202 may dynamically modify the visualization so that they are not aware of the response from the first participant 210A.

At 402G, an XR environment modification operation may be executed. In the XR environment modification operation, the system 202 may be configured to modify the XR environment based on the execution of at least the first rule of the set of rules. As discussed above, the set of rules may be associated with the modification of the XR environment. In an embodiment of the disclosure, the system 202 may be configured to modify the first primary XR environment by masking or unmasking a portion of the second avatar within the first primary XR environment based on the execution of at least the first rule.

In an embodiment of the disclosure, the system 202 may be configured to modify the second primary XR environment by masking or unmasking a portion of the first avatar within the second primary XR environment based on the execution of at least the second rule. In an embodiment of the disclosure, the system 202 may be configured to the first secondary XR environment based on the detected first action.

At 402H, a modified XR environment rendering operation may be executed. In the modified XR environment rendering operation, the system 202 may be configured to render the modified first primary XR environment on the first user device 204A. The system 202 may be further configured to render the modified second primary XR environment on the second user device 204B. Similarly, the modified first secondary XR environment may be rendered on the first user device 206A.

FIG. 5 is a diagram that depicts an exemplary registration page for the event associated with the XR environment, in accordance with an embodiment of the disclosure. FIG. 5 is explained in conjunction with elements from FIG. 1, FIG. 2, FIG. 3, and FIG. 4. With reference to FIG. 5, there is shown an exemplary diagram 500 that includes a registration page 502, a first user interface (UI) element 504, a second UI element 506, a third UI element 508, and a fourth UI element 510.

The registration page 502 may correspond to a web page or online form that may be designed to collect information from users who wish to sign up or register for the event. The registration page 502 may be used to gather relevant details from users to facilitate their participation or access to the offered event.

The first UI element 504 may correspond to a textbox where the user may write their usernames. The username may be a unique identifier for each user and may be in an alphanumeric format such as an email address. The second UI element 506 may correspond to a dropdown list where the user may select their role as one of the participants or moderators of the event. The third UI element 508 may correspond to a textbox where the user may enter their password which may be hidden. The fourth UI element 510 may correspond to a button. Upon selecting the fourth UI element 510, the user may be registered for the event.

Figure 6A:
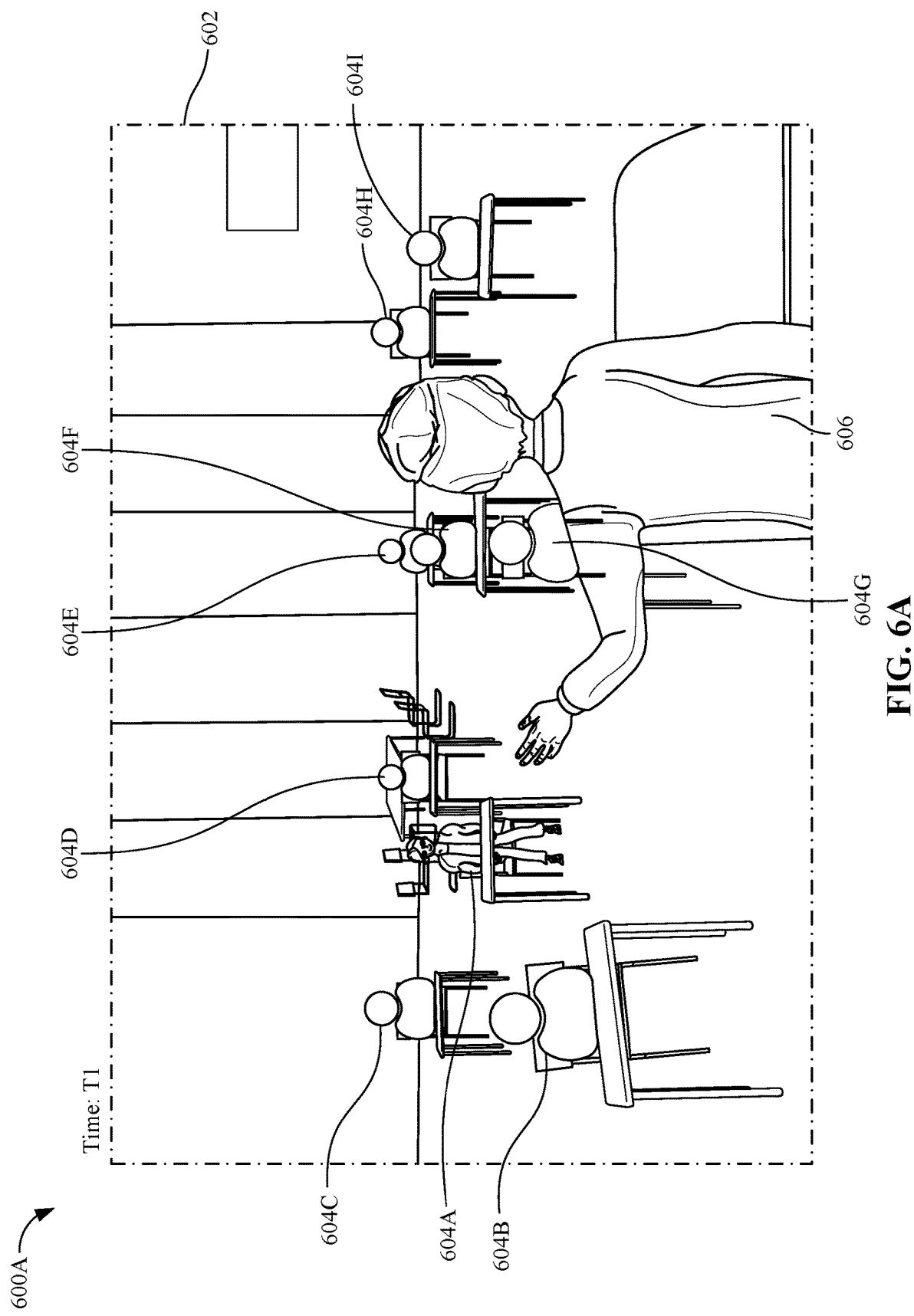
FIG. 6A is a diagram that depicts an exemplary first primary XR environment at time T1, in accordance with an embodiment of the disclosure.

FIG. 6A is a diagram that depicts an exemplary first primary XR environment at time T1, in accordance with an embodiment of the disclosure. FIG. 6A is explained in conjunction with elements from FIG. 1, FIG. 2, FIG. 3, FIG. 4, and FIG. 5. With reference to FIG. 6A, there is shown an exemplary diagram 600A that includes the first primary XR environment 602 at time T1. The first primary XR environment 602 may be associated with a learning workshop and may include a first set of avatars. The first set of avatars may include a first avatar 604A, a second avatar 604B, a third avatar 604C, a fourth avatar 604D, a fifth avatar 604E, a sixth avatar 604F, a seventh avatar 604G, an eighth avatar 604H, and a ninth avatar 604I. The first primary XR environment 602 may also include a first avatar 606 of a second set of avatars.

As discussed above, the first primary XR environment may be associated with the event (e.g., the learning workshop). The first primary XR environment 602 may be moderated by the set of moderators 212 in the real-world environment and attended by the set of participants 210 in the real-world environment. The first set of avatars may be associated with the set of participants 210 in the real-world environment and the second set of avatars may be associated with the set of moderators 212 in the real-world environment.

At time T1, the system 202 may be configured to generate the first primary XR environment 602. In an embodiment of the disclosure, the first primary XR environment 602 may be generated based on the reception of the input associated with the set of rules for rendering the first primary XR environment 602. The first primary XR environment 602 may be rendered on the first user device 204A and may include the first avatar 604A. In an embodiment of the disclosure, the first primary XR environment 602 may further include the second avatar 604B, the third avatar 604C, the fourth avatar 604D, the fifth avatar 604E, the sixth avatar 604F, the seventh avatar 604G, the eighth avatar 604H, and the ninth avatar 604I.

However, at time T1, the second avatar 604B, the third avatar 604C, the fourth avatar 604D, the fifth avatar 604E, the sixth avatar 404F, the seventh avatar 604G, the eighth avatar 604H, and the ninth avatar 604I within the first primary XR environment 602 may be masked and only the first avatar 604A and the first avatar 606A may be unmasked. The masking of an avatar may refer to the act of concealing or altering the true identity of the corresponding avatar. Such masking may be done using various techniques such as using a pseudonym, creating a fictional character, or manipulating visual representations like profile pictures or avatars to obscure one's true identity. For example, as depicted in FIG. 6A, the second avatar 604B, the third avatar 604C, the fourth avatar 604D, the fifth avatar 604E, the sixth avatar 404F, the seventh avatar 604G, the eighth avatar 604H, and the ninth avatar 604I may be replaced by an emoticon.

Figure 6B:
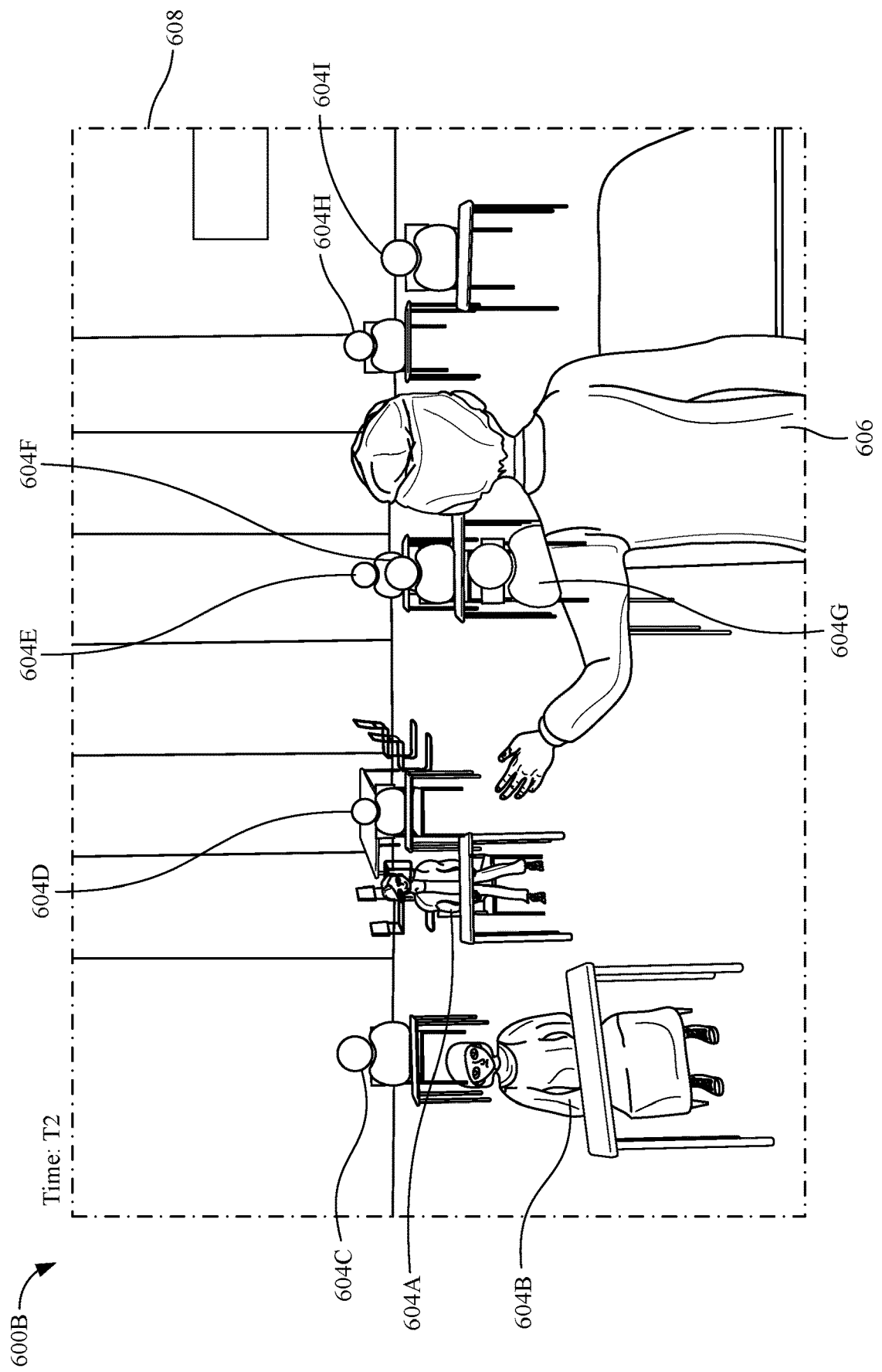
FIG. 6B is a diagram that depicts an exemplary modified first primary XR environment at time T2, in accordance with an embodiment of the disclosure.

FIG. 6B is a diagram that depicts an exemplary modified first primary XR environment at time T2, in accordance with an embodiment of the disclosure. FIG. 6B is explained in conjunction with elements from FIG. 1, FIG. 2, FIG. 3, FIG. 4, FIG. 5, and FIG. 6A. With reference to FIG. 6B, there is shown an exemplary diagram 600B that includes a modified first primary XR environment 608 at time T2. Similar to the first primary XR environment 602, the modified first primary XR environment 608 may be associated with the learning workshop and may include a first set of avatars. The first set of avatars may include the first avatar 604A, the second avatar 604B, the third avatar 604C, the fourth avatar 604D, the fifth avatar 604E, the sixth avatar 404F, the seventh avatar 604G, the eighth avatar 604H, and the ninth avatar 604I. The first primary XR environment 602 may also include the first avatar 606 of a second set of avatars.

Between time T1 and time T2, the system 202 may be configured to detect a first action that may be performed by the second avatar 604B of the first set of avatars. By way of example and not limitation, the second avatar 604B may raise its hand when the first avatar 606 asks a question and further provides an answer to the question. Such raise of hand and answering of the question may be deemed as the action of the second avatar 604B and may be visible in the first secondary XR environment visible to the first avatar 606 and may not be visible in the first primary XR environment 602.

The system 202 may be configured to compare the detected action with a pre-set action. For example, if the question is a one-word answer question, then the pre-set action may correspond to the right answer for the question. In case the answer provided by the first avatar 604A may be correct, then a first rule may be triggered. Otherwise, a second rule may be triggered.

At time T2, the system 202 may be further configured to modify the first primary XR environment 602 by unmasking a portion of the second avatar 604B within the first primary XR environment 602 based on the execution of at least the first rule.

In the first primary XR environment 602, the second avatar 604B, the third avatar 604C, the fourth avatar 604D, the fifth avatar 604E, the sixth avatar 404F, the seventh avatar 604G, the eighth avatar 604H, and the ninth avatar 604I may be visible (or unmasked) similar to the first avatar 604A. In such a scenario, the system 202 may be further configured to modify the first primary XR environment 602 by masking a portion of the second avatar 604B within the first primary XR environment 602 based on the execution of at least one of the first rule or the second rule.

Figure 6C:
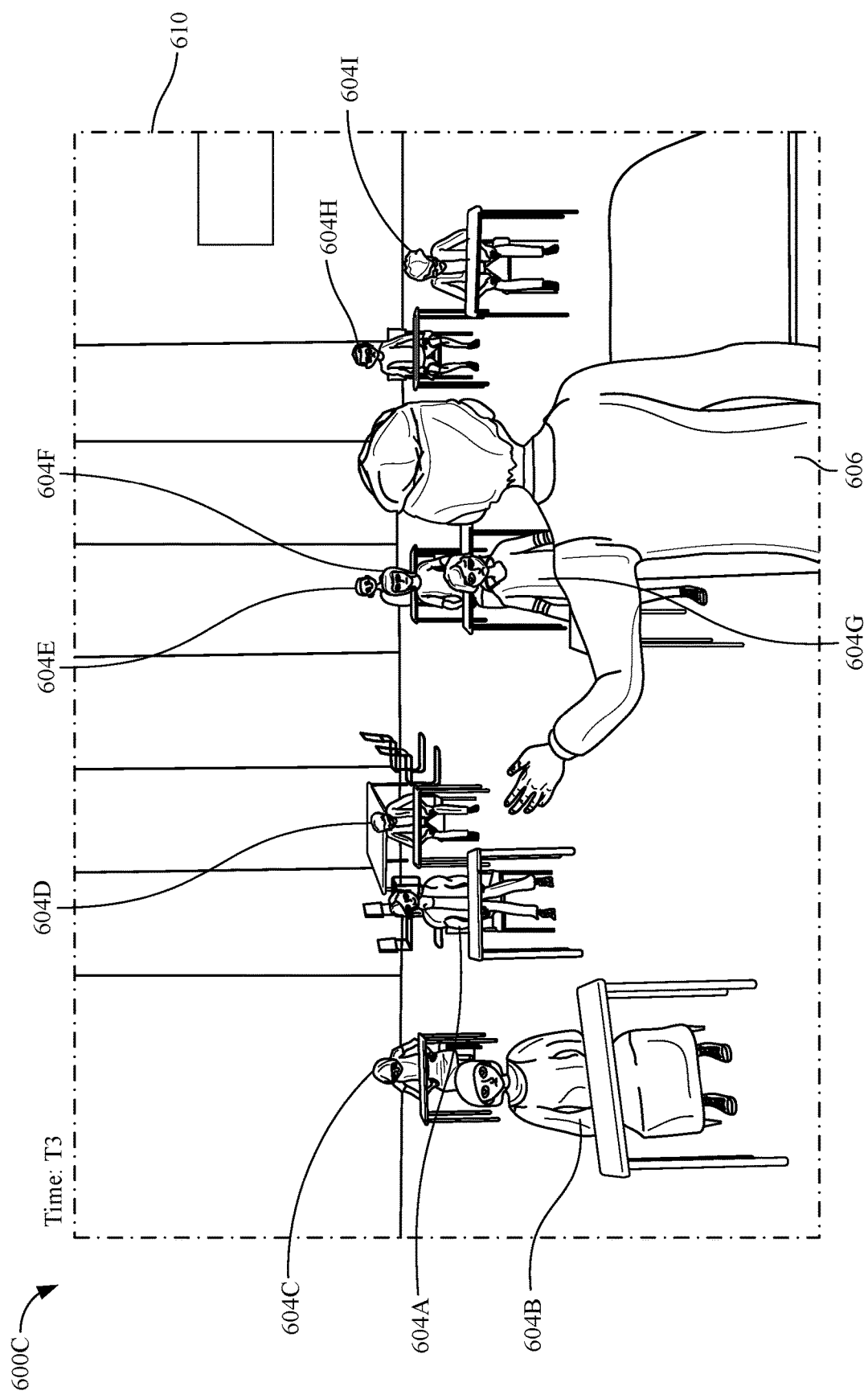
FIG. 6C is a diagram that depicts an exemplary modified first primary XR environment at time T3, in accordance with an embodiment of the disclosure.

FIG. 6C is a diagram that depicts an exemplary modified first primary XR environment at time T3, in accordance with an embodiment of the disclosure. FIG. 6C is explained in conjunction with elements from FIG. 1, FIG. 2, FIG. 3, FIG. 4, FIG. 5, FIG. 6A, and FIG. 6B. With reference to FIG. 6C, there is shown an exemplary diagram 600C that includes a modified first primary XR environment 610 at time T3. Similar to the first primary XR environment 602, the modified first primary XR environment 610 may be associated with the learning workshop and may include the first set of avatars. The first set of avatars may include the first avatar 604A, the second avatar 604B, the third avatar 604C, the fourth avatar 604D, the fifth avatar 604E, the sixth avatar 404F, the seventh avatar 604G, the eighth avatar 604H, and the ninth avatar 604I. The first primary XR environment 602 may also include the first avatar 606 of a second set of avatars.

At time T3, the system 202 may be further configured to modify the first primary XR environment 602 by unmasking a portion of the second avatar 604B within the first primary XR environment 602 based on the execution of at least the first rule.

In an embodiment of the disclosure, in the first primary XR environment 602, the second avatar 604B, the third avatar 604C, the fourth avatar 604D, the fifth avatar 604E, the sixth avatar 404F, the seventh avatar 604G, the eighth avatar 604H, and the ninth avatar 604I may be visible (or unmasked) similar to the first avatar 604A based on the actions of each of the third avatar 604C, the fourth avatar 604D, the fifth avatar 604E, the sixth avatar 404F, the seventh avatar 604G, the eighth avatar 604H, and the ninth avatar 604I. In an alternative embodiment of the disclosure, some of the avatars of the first set of avatars may be masked while some of the avatars may be unmasked based on the answers provided by the corresponding avatar.

Figure 7A:
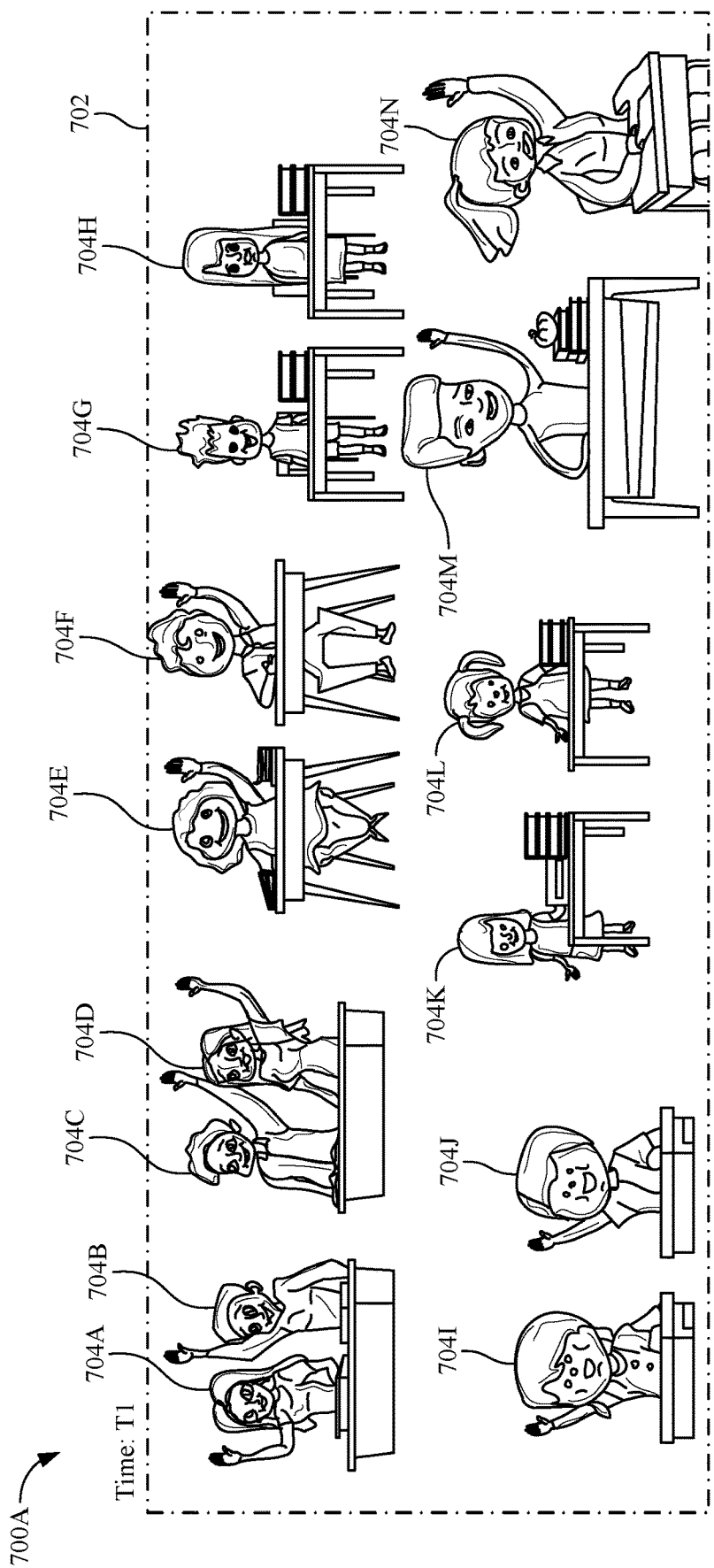
FIG. 7A is a diagram that depicts an exemplary secondary XR environment at time T1, in accordance with an embodiment of the disclosure.

FIG. 7A is a diagram that depicts an exemplary secondary XR environment at time T1, in accordance with an embodiment of the disclosure. FIG. 7 is explained in conjunction with elements from FIG. 1, FIG. 2, FIG. 3, FIG. 4, FIG. 5, FIG. 6A, FIG. 6B, and FIG. 6C. With reference to FIG. 7A, there is shown an exemplary diagram 700A that includes a secondary XR environment 702 at time T1. The secondary XR environment 702 may include the first set of avatars 704 associated with a set of participants. The first set of avatars may include a first avatar 704A, a second avatar 704B, a third avatar 704C, a fourth avatar 704D, a fifth avatar 704E, a sixth avatar 704F, a seventh avatar 704G, an eighth avatar 704H, a ninth avatar 704I, a tenth avatar 704J, an eleventh avatar 704K, a twelfth avatar 704L, a thirteenth avatar 704M, and a fourteenth avatar 704N. The secondary XR environment 702 may also include a second set of avatars (not shown).

At time T1, the first avatar of the second set of avatars may have asked a question to the set of participants and may ask the set of participants to raise their hands if they wish to answer. The participants who wish to answer might raise their hands as shown in FIG. 7A. For example and as shown in FIG. 7A, the first avatar 704A, the second avatar 704B, the third avatar 704C, the fourth avatar 704D, the fifth avatar 704E, the sixth avatar 704F, the ninth avatar 704I, the tenth avatar 704J, the thirteenth avatar 704M, and the fourteenth avatar 704N may raise their hands. Such raising of the hand may be deemed as an action of the corresponding avatar. Each avatar of the first set of avatars 704 may be visible within the secondary XR environment 702. Specifically, each avatar of the first set of avatars 704 who have raised their hands may be visible within the secondary XR environment 702. Also, each avatar of the first set of avatars 704 who have not raised their hands may be visible within the secondary XR environment 702.

Figure 7B:
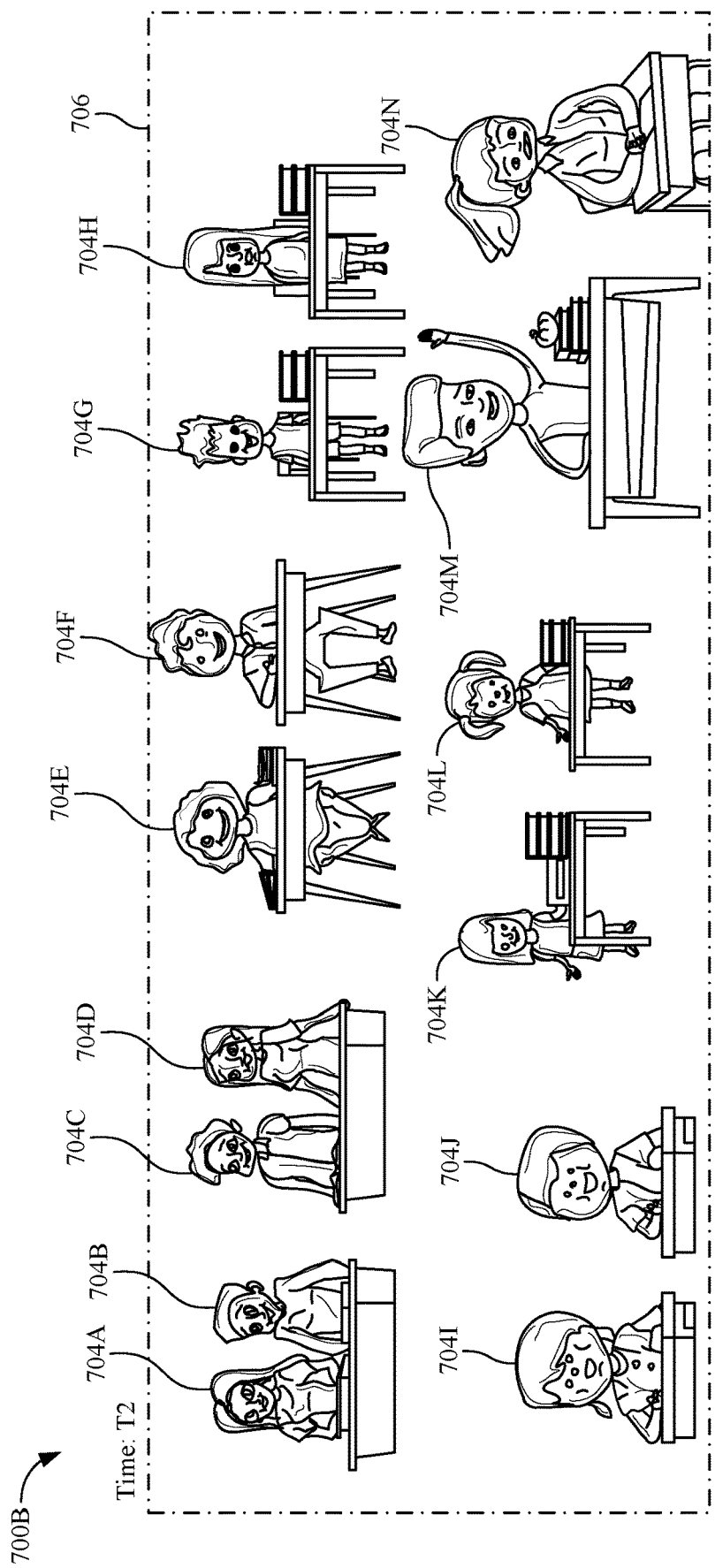
FIG. 7B is a diagram that depicts an exemplary primary XR environment at time T1, in accordance with an embodiment of the disclosure.

FIG. 7B is a diagram that depicts an exemplary primary XR environment at time T1, in accordance with an embodiment of the disclosure. FIG. 7B is explained in conjunction with elements from FIG. 1, FIG. 2, FIG. 3, FIG. 4, FIG. 5, FIG. 6A, FIG. 6B, FIG. 6C, and FIG. 7A. With reference to FIG. 7B, there is shown an exemplary diagram 700B that includes a primary XR environment 706 at time T2. The primary XR environment 706 may include the first set of avatars 704 associated with the set of participants. The first set of avatars may include a first avatar 704A, a second avatar 704B, a third avatar 704C, a fourth avatar 704D, a fifth avatar 704E, a sixth avatar 704F, a seventh avatar 704G, an eighth avatar 704H, a ninth avatar 704I, a tenth avatar 704J, an eleventh avatar 704K, a twelfth avatar 704L, a thirteenth avatar 704M, and a fourteenth avatar 704N. The secondary XR environment 702 may also include a second set of avatars (not shown) and may be rendered on a user device associated with the thirteenth avatar 704M who has raised their hand.

At time T1, each avatar of the first set of avatars 704 who have raised their hands may be visible within the secondary XR environment 702. Also, each avatar of the first set of avatars 704 who have not raised their hands may be visible within the secondary XR environment 702. However, at time T1, each avatar who might have raised their hands may see only their hands risen although other avatars might also have raised their hands. This may be done based on the set of rules provided as the input by the moderator of the XR environment. As shown in FIG. 7B, the thirteenth avatar 704M who have raised their hand may be visible only on the user device associated with the thirteenth avatar 704M. Similarly, the first avatar 704A, the second avatar 704B, the third avatar 704C, the fourth avatar 704D, the fifth avatar 704E, the sixth avatar 704F, the ninth avatar 704I, the tenth avatar 704J, and the fourteenth avatar 704N who have raised may be visible only within the respective primary XR environments visible on the corresponding user device.

Figure 8:
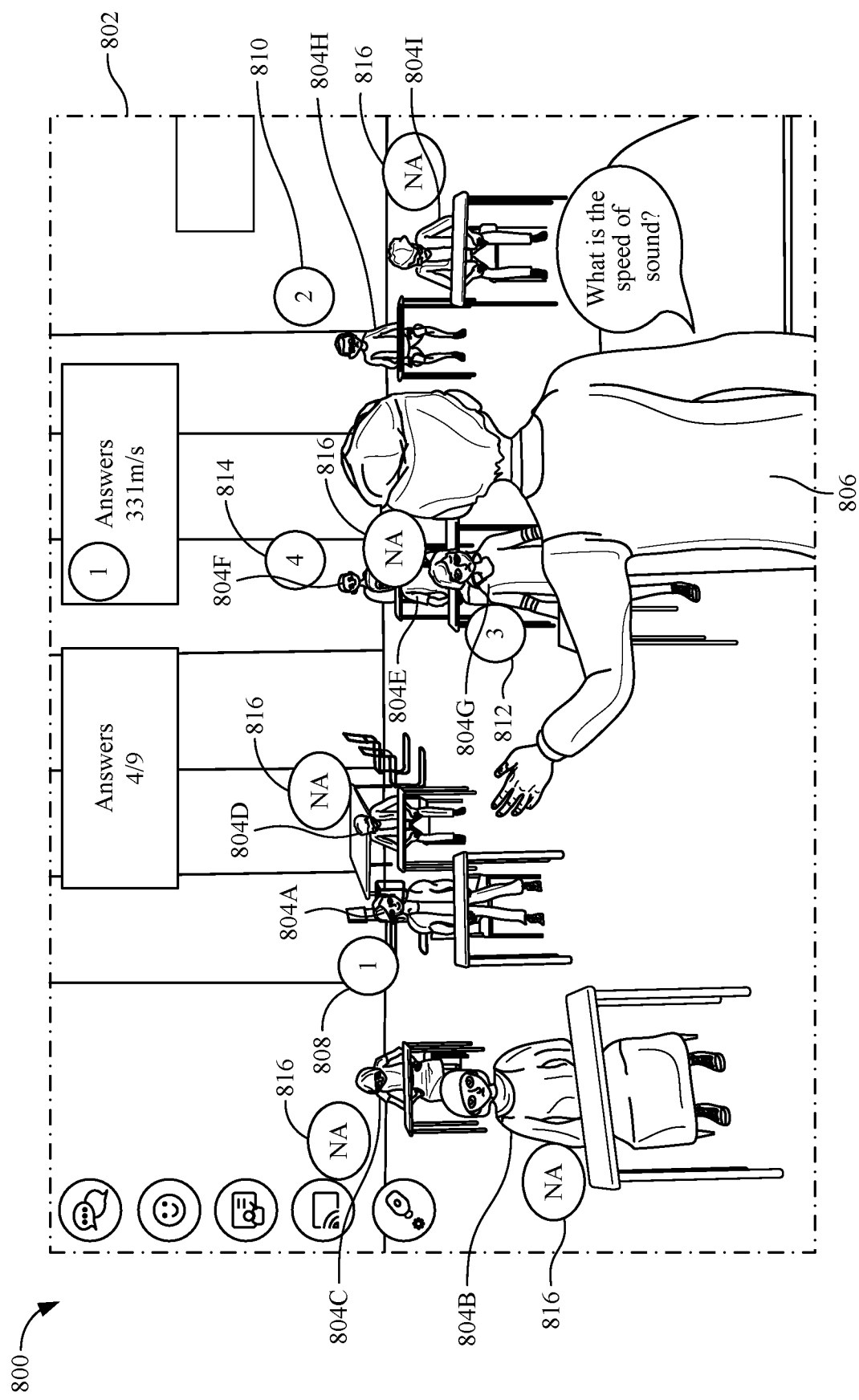
FIG. 8 is a diagram that depicts an exemplary secondary XR environment, in accordance with an embodiment of the disclosure.

FIG. 8 is a diagram that depicts an exemplary secondary XR environment, in accordance with an embodiment of the disclosure. FIG. 8 is explained in conjunction with elements from FIG. 1, FIG. 2, FIG. 3, FIG. 4, FIG. 5, FIG. 6A, FIG. 6B, FIG. 6C, FIG. 7A, and FIG. 7B. With reference to FIG. 8, there is shown an exemplary diagram 800 that includes a secondary XR environment 802. The secondary XR environment 802 may be associated with a learning workshop and may include a first set of avatars. The first set of avatars may include a first avatar 804A, a second avatar 804B, a third avatar 804C, a fourth avatar 804D, a fifth avatar 804E, a sixth avatar 804F, a seventh avatar 804G, an eighth avatar 804H, and a ninth avatar 804I. The secondary XR environment 802 may also include a first avatar 806 of a second set of avatars.

In an embodiment of the disclosure, the first avatar 806 of the second set of avatars may ask a question to the first set of avatars. For example, the question may be "What is the speed of sound?". Based on the asked question, the first set of avatars may answer the asked question that may be deemed as an action. In an embodiment of the disclosure, the system 202 may be configured to detect the avatar who provided the answer correctly. The system 202 may be further configured to detect the timing of the answers provided by each avatar (or the participant). Based on the detected timings, the system 202 may be configured to modify the secondary XR environment 802 to include one or more markers associated with the each avatar based on the detected action. The one or more markers may indicate an order in which the answers may be provided by the avatars.

As shown in FIG. 8, the first avatar 804A may answer the question correctly and before every other avatar, therefore the system 202 may be configured to modify the secondary XR environment 802 by adding a first marker 808 indicating a numerical value of "1" in the vicinity of the first avatar 804A. The eighth avatar 804H may have answered the question correctly after the first avatar 804A, therefore the system 202 may be configured to modify the secondary XR environment 802 by adding a second marker 810 indicating the numerical value of "2" in the vicinity of the eighth avatar 804H. The seventh avatar 804G may have answered the question correctly after the first avatar 804A and the eighth avatar 804H, therefore the system 202 may be configured to modify the secondary XR environment 802 by adding a third marker 812 indicating the numerical value of "3" in the vicinity of the seventh avatar 804G. The sixth avatar 804F may have answered the question correctly after the first avatar 804A, the eighth avatar 804H, and the seventh avatar 804G, therefore the system 202 may be configured to modify the secondary XR environment 802 by adding a fourth marker 814 indicating the numerical value of "4" in the vicinity of the sixth avatar 804F. All other participants may not have answered the question, therefore the system 202 may be configured to modify the secondary XR environment 802 by adding a fifth marker 816 indicating "NA" in the vicinity of the corresponding avatars.

Figure 9:
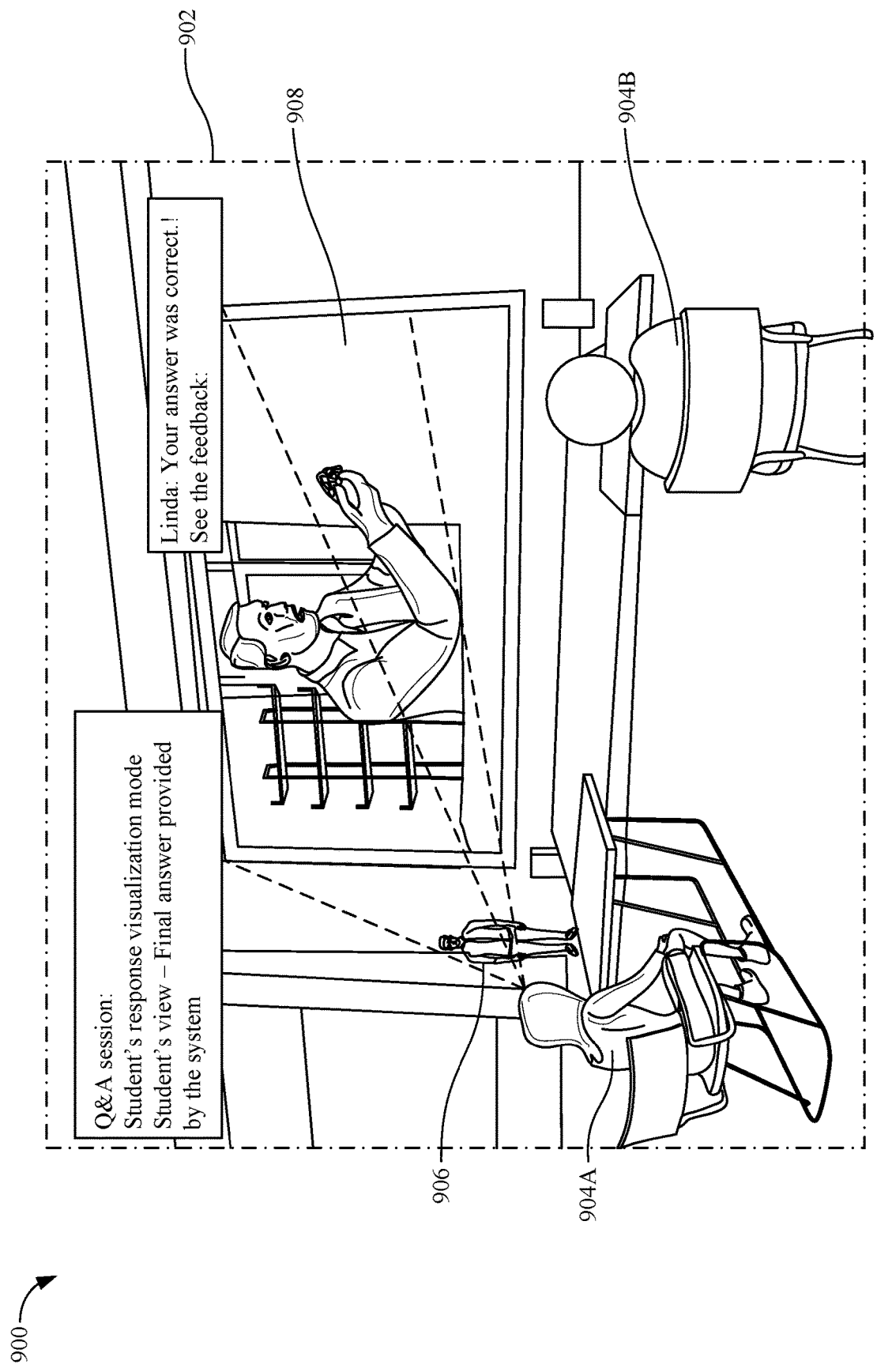
FIG. 9 is a diagram that depicts an exemplary primary XR environment, in accordance with an embodiment of the disclosure.

FIG. 9 is a diagram that depicts an exemplary primary XR environment, in accordance with an embodiment of the disclosure. FIG. 9 is explained in conjunction with elements from FIG. 1, FIG. 2, FIG. 3, FIG. 4, FIG. 5, FIG. 6A, FIG. 6B, FIG. 6C, FIG. 7A, FIG. 7B, and FIG. 8. With reference to FIG. 9, there is shown an exemplary diagram 900 that includes a first primary XR environment 902. The first primary XR environment 902 may be associated with a learning workshop and may include a first set of avatars. The first set of avatars may include a first avatar 904A and a second avatar 904B. The first secondary XR environment 902 may also include a first avatar 906 of a second set of avatars. A portion of the second avatar 904B may be masked.

In an embodiment of the disclosure, the first avatar 904A may have answered a question asked by the first avatar 906 of the second set of avatars correctly and the second avatar 904B may have answered the question asked by the first avatar 906 of the second set of avatars incorrectly. Therefore, the portion of the second avatar 904B may be masked within the first XR environment 902 that may be rendered on a user device associated with the first avatar 904A. In an embodiment of the disclosure, the portion of the first avatar 904A may be masked within a second XR environment that may be rendered on a user device associated with the second avatar 904B.

In an embodiment of the disclosure, the system 202 may be configured to render a feedback session to each avatar of the first set of avatars based on the answers provided by the corresponding avatar. As shown in FIG. 9, the system 202 may render the feedback session 908 to the first avatar 904A based on the answer provided by the first avatar 904A.

In an embodiment of the disclosure, the system 202 may be configured to record the responses of each participant to the asked question. At the end of the question-and-answer session, the teacher may reveal the answers provided by each participant with appropriate body language and voice replies. The system 202 may update the XR environment with the recorded contents, allowing each participant to identify and validate their responses.

In an embodiment of the disclosure, revealing the answers provided by each participant with voice and body language in the XR environment, the teacher or moderator may also selectively define whose responses will be revealed and in what sequence the answers will be revealed, and accordingly, the system 202 may be configured to modify the XR environment for all the participants.

In case of the closed answer-based questions (questions that have true/false, yes/no, or one word/data answer as a part), the system 202 may be configured to determine whether the answer provided by the user is correct or not. Accordingly, the system 202 may be configured to modify the primary XR environment associated with each of the set of participants. In the case of open answer-based questions that require more than one data/word to explain or provide information, the system 202 may be configured to analyze the text/words to identify the level of confidence for the answer provided by each participant. In an embodiment of the disclosure, the system 202 may be configured to generate a final answer or a summary based on the information with a higher level of confidence from each answer provided by each participant of the set of participants 210. The system 202 may maintain a catalog with the correct answers or may have a link to different education sources. The system 202 may further compare the information provided by each participant with the information from the catalog/education sources and further calculate a percentage of confidence level. The answer with the highest confidence level may be selected for rendering purposes.

In an embodiment of the disclosure, the system 202 may be configured to share the selected answer separately with each participant according to their preferred mode or needs to display the information: video with a specific character, only audio (appropriate body language and voice reply), only text or a combination between these elements. In an example, for participants who answered correctly, the system 202 may be configured to modify the XR environment by adding a virtual object that may be used to render that "Your answer is correct", and the final answer generated by the system will be displayed as "Feedback".

In an embodiment of the disclosure, the system 202 may be configured to record the statistics of the answers provided by the set of participants. Such statistics may include a percentage of correct answers, a level of confidence, how many times each participant answered first, and like. Such information may be stored in the server 208 and may be accessible to each participant at a later time.

Figure 10:
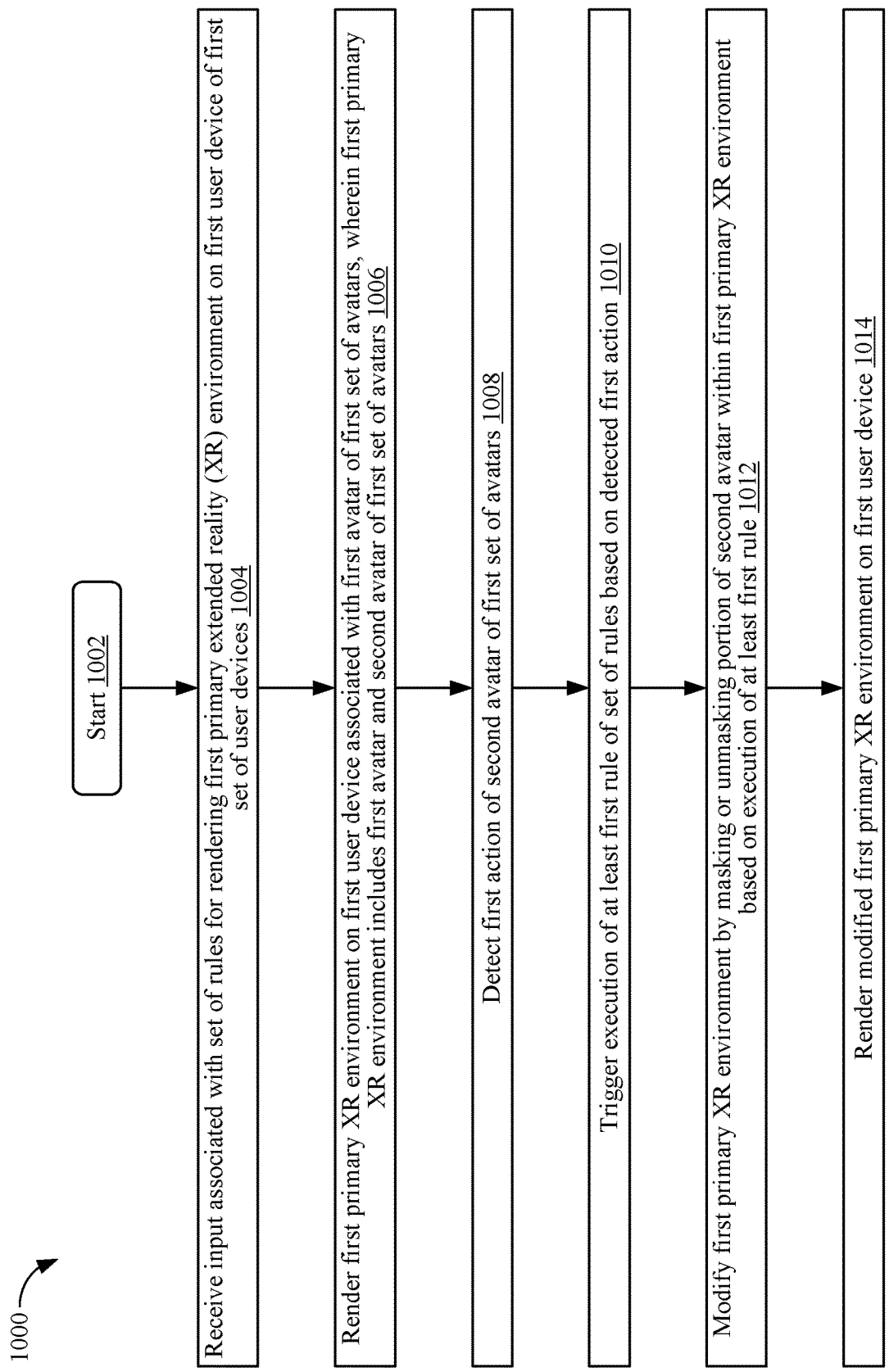
FIG. 10 is a flowchart that illustrates an exemplary method for dynamic modification of an extended reality environment, in accordance with an embodiment of the disclosure.

FIG. 10 is a flowchart that illustrates an exemplary method for dynamic modification of an extended reality environment, in accordance with an embodiment of the disclosure. FIG. 10 is explained in conjunction with elements from FIG. 1, FIG. 2, FIG. 3, FIG. 4, FIG. 5, FIG. 6A, FIG. 6B, FIG. 6C, FIG. 7A, FIG. 7B, FIG. 8, and FIG. 9. With reference to FIG. 10, there is shown a flowchart 1000. The operations of the exemplary method may be executed by any computing system, for example, by the computer 102 of FIG. 1 or the system 202 of FIG. 2. The operations of the flowchart 1000 may start at 1002.

At 1004, an input associated with the set of rules for rendering the first primary XR environment on the first user device 204A of the first set of user devices 204 may be received. In an embodiment of the disclosure, the system 202 may be configured to receive the input associated with the set of rules for rendering the first primary XR environment on the first user device 204A of the first set of user devices 204. Details about the first XR environment 302 are provided, for example, in FIG. 3, and FIG. 6A.

At 1006, the first primary XR environment 302 may be rendered on the first user device 204A associated with the first avatar 304A of the first set of avatars 304. The first primary XR environment 302 may include the first avatar 304A and the second avatar 304B of the first set of avatars 304. In an embodiment of the disclosure, the system 202 may be configured to render the first primary XR environment 302 on the first user device 204A associated with the first avatar 304A of the first set of avatars 304, the first primary XR environment includes the first avatar 304A and the second avatar 304B of the first set of avatars 304. Details about the first set of avatars 304 are provided, for example, in FIG. 3, and FIG. 6A.

At 1008, the first action of the second avatar 304B of the first set of avatars 304 may be detected. In an embodiment of the disclosure, the system 202 may be configured to detect the first action of the second avatar 304B of the first set of avatars 304. Details about the detection of the first action are provided, for example, in FIG. 7A, and FIG. 7B.

At 1010, the execution of at least a first rule of the set of rules may be triggered based on the detected first action. In an embodiment of the disclosure, the system 202 may be configured to trigger the execution of at least a first rule of the set of rules based on the detected first action.

At 1012, the first primary XR environment 302 may be modified by masking or unmasking the portion of the second avatar 304B within the first primary XR environment 302 based on the execution of at least the first rule. In an embodiment of the disclosure, the system 202 may be configured to modify the first primary XR environment 302 by masking or unmasking the portion of the second avatar 304B within the first primary XR environment 302 based on the execution of at least the first rule. Details about the modified first XR environment 608 are provided, for example, in FIG. 6B and FIG. 6C.

At 1014, the modified first primary XR environment 608 may be rendered on the first user device 204A. In an embodiment of the disclosure, the system 202 may be configured to the modified first primary XR environment 608 on the first user device 204A. Control may pass to the end.

Various embodiments of the disclosure may provide a non-transitory computer readable medium and/or storage medium having stored thereon, instructions executable by a machine and/or a computer to operate a system (e.g., the system 202) for dynamic modification of extended reality environment. The instructions may cause the machine and/or computer to perform operations that include receiving an input associated with a set of rules for rendering a first primary extended reality (XR) environment on a first user device of a first set of user devices. The operations further include rendering the first primary XR environment on the first user device associated with a first avatar of a first set of avatars. The first primary XR environment includes the first avatar and a second avatar of the first set of avatars. The operations further include detecting a first action of the second avatar of the first set of avatars. The operations further include triggering the execution of at least a first rule of the set of rules based on the detected first action. The operations further include modifying the first primary XR environment by masking or unmasking a portion of the second avatar within the first primary XR environment based on the execution of at least the first rule. The operations further include rendering the modified first primary XR environment on the first user device.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a computer, an input associated with a set of rules for rendering a first primary extended reality (XR) environment on a first user device of a first set of user devices, wherein
   the first primary XR environment is associated with an event attended by a set of participants in a real-world environment;
   rendering, by the computer, the first primary XR environment on the first user device associated with a first avatar of a first set of avatars, wherein the first primary XR environment comprises the first avatar and a second avatar of the first set of avatars, wherein
   the first avatar is associated with a first participant of the set of participants,
   the second avatar is associated with a second participant of the set of participants,
   the set of rules includes a first rule that specifies that the first participant of the set of participants is disabled from visualizing and listening to the second avatar of the second participant of the set of participants, after a first action of the second avatar is detected, and
   the set of rules further specifies that a third participant of the set of participants is enabled to visualize and listen to the second avatar, after the first action of the second avatar is detected;
   detecting, by the computer, the first action of the second avatar of the first set of avatars;
   triggering, by the computer, execution of at least the first rule of the set of rules based on the detected first action;
   modifying, by the computer, the first primary XR environment by masking a portion of the second avatar within the first primary XR environment based on the execution of the at least the first rule, wherein the masking of the portion of the second avatar corresponds to disabling the first participant from visualizing and listening to the second avatar; and
   rendering, by the computer, the modified first primary XR environment on the first user device.

2. The computer-implemented method of claim 1, further comprising:
   rendering, by the computer, a second primary XR environment comprising the second avatar on a second user device of the first set of user devices, wherein the second user device is associated with the second avatar;
   detecting, by the computer, a second action of the first avatar of the first set of avatars;
   triggering, by the computer, execution of at least a second rule of the set of rules based on the detected second action;
   modifying, by the computer, the second primary XR environment by masking a portion of the first avatar within the second primary XR environment based on the execution of at least the second rule; and
   rendering, by the computer, the modified second primary XR environment on the second user device.

3. The computer-implemented method of claim 1, wherein the first primary XR environment is moderated by a set of moderators in the real-world environment.

4. The computer-implemented method of claim 3, wherein the first action is detected based on one or more gestures of the first participant of the set of participants, or an utterance of a speech by the first participant.

5. The computer-implemented method of claim 3, further comprising:
   rendering, by the computer, a first secondary XR environment comprising the first avatar and the second avatar on a first user device of a second set of user devices, wherein the second set of user devices is associated with the set of moderators;
   detecting, by the computer, the first action of the second avatar;
   modifying, by the computer, the first secondary XR environment based on the detected first action; and
   rendering, by the computer, the modified first secondary XR environment on the first user device of the second set of user devices, wherein the modified first secondary XR environment indicates the first action of the second avatar.

6. The computer-implemented method of claim 5, further comprising:
   modifying, by the computer, the first secondary XR environment to include one or more markers associated with the second avatar based on the detected first action; and
   rendering, by the computer, the modified first secondary XR environment on at least one of the second set of user devices.

7. The computer-implemented method of claim 1, wherein the input is received from a second set of user devices associated with a set of moderators of the first primary XR environment.

8. The computer-implemented method of claim 7, wherein the first primary XR environment further comprises a second set of avatars associated with the set of moderators of the event associated with the first primary XR environment.

9. The computer-implemented method of claim 1, further comprising:
   generating, by the computer, the first primary XR environment based on the set of rules, wherein the first primary XR environment is customized for the first participant of the set of participants of the first primary XR environment; and rendering, by the computer, the first primary XR environment on the first user device of the first set of user devices, wherein the first user device is associated with the first participant.

10. The computer-implemented method of claim 1, further comprising:
receiving, by the computer, a setup input associated with a generation of the first primary XR environment associated with the event;
identifying, by the computer, the set of participants and a set of moderators based on the setup input;
generating, by the computer, the first set of avatars associated with the set of participants and a second set of avatars associated with the set of moderators based on the identification; and
rendering, by the computer, the first primary XR environment on the first user device, the first primary XR environment comprises the first avatar of the first set of avatars and at least one avatar of the second set of avatars.

11. The computer-implemented method of claim 1, further comprising:
comparing, by the computer, the detected first action with a pre-set action; and
triggering, by the computer, the execution of at least the first rule of the set of rules based on the comparison.

12. The computer-implemented method of claim 1, wherein the set of rules is associated with at least one of: the modification of the first primary XR environment or the rendering of the modified first primary XR environment on the first user device.

13. The computer-implemented method of claim 1, wherein the event corresponds to a learning workshop.

14. The computer-implemented method of claim 13,
wherein the first set of avatars within the first primary XR environment is associated with a set of students attending the learning workshop, and
wherein a second set of avatars within the first primary XR environment is associated with a set of teachers conducting the learning workshop.

15. A system, comprising:
processor set configured to:
receive an input associated with a set of rules for rendering a first primary extended reality (XR) environment on a first user device of a first set of user devices, wherein
the first primary XR environment is associated with an event attended by a set of participants in a real-world environment;
render the first primary XR environment on the first user device associated with a first avatar of a first set of avatars, wherein the first primary XR environment comprises the first avatar and a second avatar of the first set of avatars, wherein
the first avatar is associated with a first participant of the set of participants,
the second avatar is associated with a second participant of the set of participants,
the set of rules includes a first rule that specifies that the first participant of the set of participants is disabled from visualizing and listening to the second avatar of the second participant of the set of participants, after a first action of the second avatar is detected, and
the set of rules further specifies that a third participant of the set of participants is enabled to visualize and listen to the second avatar, after the first action of the second avatar is detected;
detect the first action of the second avatar of the first set of avatars;
trigger execution of at least the first rule of the set of rules based on the detected first action;
modify the first primary XR environment by masking a portion of the second avatar within the first primary XR environment based on the execution of the at least the first rule, wherein the masking of the portion of the second avatar corresponds to disabling the first participant from visualizing and listening to the second avatar; and
render the modified first primary XR environment on the first user device.

16. The system of claim 15, wherein the processor set is further configured to:
render a second primary XR environment comprising the second avatar on a second user device of the first set of user devices, wherein the second user device is associated with the second avatar;
detect a second action of the first avatar of the first set of avatars;
trigger execution of at least a second rule of the set of rules based on the detected second action;
modify the second primary XR environment by masking a portion of the first avatar within the second primary XR environment based on the execution of at least the second rule; and
render the modified second primary XR environment on the second user device.

17. The system of claim 15,
wherein the first primary XR environment is associated with the event corresponding to a learning workshop, and wherein the first set of avatars is associated with a set of students attending the learning workshop and a second set of avatars is associated with a set of teachers conducting the learning workshop.

18. A computer program product for a dynamic modification of an extended reality (XR) environment, the computer program product comprising a computer-readable storage medium having program instructions embodied therewith, the program instructions executable by a computer to cause the computer to:
receiving, by the computer, an input associated with a set of rules for rendering a first primary extended reality (XR) environment on a first user device of a first set of user devices, wherein
the first primary XR environment is associated with an event attended by a set of participants in a real-world environment;
rendering, by the computer, the first primary XR environment on the first user device associated with a first avatar of a first set of avatars, wherein the first primary XR environment comprises the first avatar and a second avatar of the first set of avatars, wherein
the first avatar is associated with a first participant of the set of participants,
the second avatar is associated with a second participant of the set of participants,
the set of rules includes a first rule that specifies that the first participant of the set of participants is disabled from visualizing and listening to the second avatar of the second participant of the set of participants, after a first action of the second avatar is detected, and the set of rules further specifies that a third participant of the set of participants is enabled to visualize and listen to the second avatar, after the first action of the second avatar is detected;

detecting, by the computer, the first action of the second avatar of the first set of avatars;

triggering, by the computer, execution of at least the first rule of the set of rules based on the detected first action;

modifying, by the computer, the first primary XR environment by masking a portion of the second avatar within the first primary XR environment based on the execution of at least the first rule, wherein the masking of the portion of the second avatar corresponds to disabling the first participant from visualizing and listening to the second avatar; and rendering, by the computer, the modified first primary XR environment on the first user device.

* * * * *